(12) United States Patent  
Dove

(10) Patent No.: US 7,361,398 B2  
(45) Date of Patent: Apr. 22, 2008

(54) LOW STRESS TO SEAL EPTFE GASKET MATERIAL

(75) Inventor: Kevin E. Dove, Wilmington, DE (US)

(73) Assignee: Gore Enterprise Holdings, Inc., Newark, DE (US)

( * ) Notice: Subject to any disclaimer, the term of this patent is extended or adjusted under 35 U.S.C. 154(b) by 16 days.

(21) Appl. No.: 11/209,539

(22) Filed: Aug. 22, 2005

(65) Prior Publication Data

US 2007/0040338 A1 Feb. 22, 2007

(51) Int. Cl.  
*B32B 3/26* (2006.01)

(52) U.S. Cl. .............. 428/316.6; 428/318.6; 428/319.3; 428/319.7; 428/317.9; 277/608; 277/626

(58) Field of Classification Search .......... 428/316.6, 428/318.6, 319.3, 319.7, 317.9; 277/608, 277/626  
See application file for complete search history.

(56) References Cited

U.S. PATENT DOCUMENTS

| | | | |
|---|---|---|---|
| 3,953,566 A | 4/1976 | Gore | 264/288 |
| 4,096,227 A | 6/1978 | Gore | 264/210 R |
| 4,187,390 A | 2/1980 | Gore | 174/102 R |
| 4,985,296 A | 1/1991 | Mortimer, Jr. | 428/220 |
| 5,964,465 A | 10/1999 | Mills et al. | 277/316 |
| 6,485,809 B1 | 11/2002 | Minor et al. | 428/66.4 |
| 7,179,525 B2 * | 2/2007 | Dove | 428/316.6 |
| 2003/0003290 A1 | 1/2003 | Hisano et al. | 428/308.4 |

FOREIGN PATENT DOCUMENTS

| WO | 01/11274 | 2/2001 |
|---|---|---|
| WO | WO 01/27501 | 4/2001 |

* cited by examiner

*Primary Examiner*—Hai Vo  
(74) *Attorney, Agent, or Firm*—Dianne Burkhard

(57) ABSTRACT

A low stress-to-seal gasket material is described. Gaskets made according to the present invention comprise at least two tapes of porous PTFE and a substantially air impermeable layer at the interface of the two tape layers. The tape layers each have a non-porous region extending the tape length and separating two porous regions. The non-porous regions of at least two tape layers are not aligned in the z-axis direction.

31 Claims, 11 Drawing Sheets

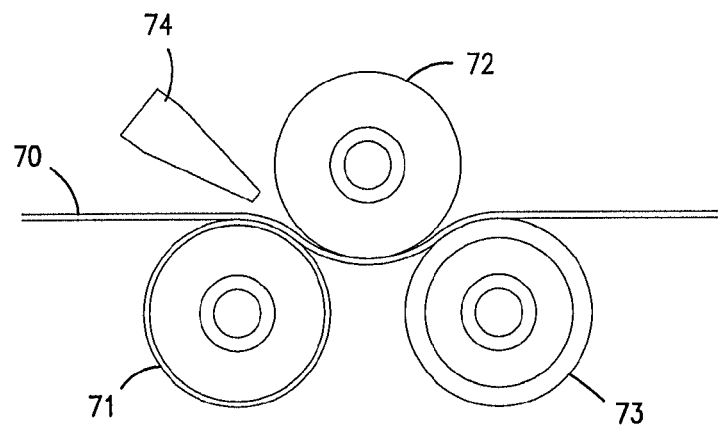
FIG. 7
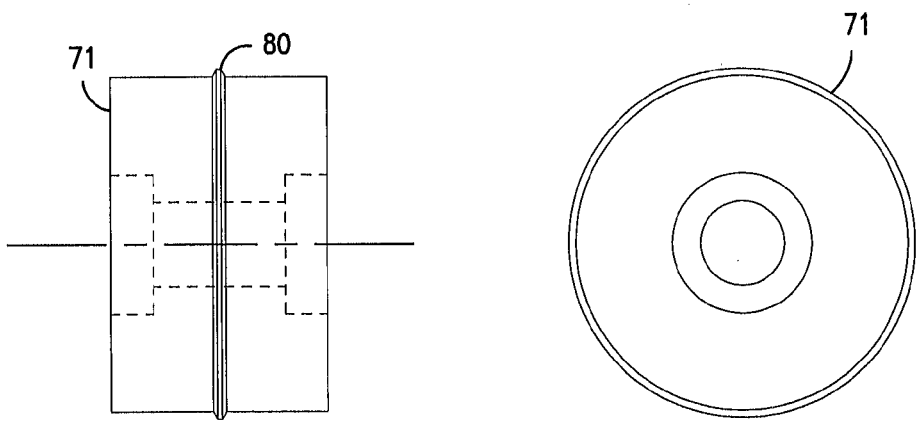
FIG. 8a  FIG. 8b

LOW STRESS TO SEAL EPTFE GASKET MATERIAL

BACKGROUND OF THE INVENTION

A wide variety of gaskets are known for use in sealing applications. Porous expanded polytetrafluoroethylene (ePTFE) is widely used today as a gasket material. As disclosed in U.S. Pat. No. 3,953,566 to Gore, this material has numerous properties making it highly desirable as a gasket. These properties include compressibility, conformability, chemical resistance, high strength, and resistance to creep relaxation and loss of sealing pressure.

In many sealing applications, the gasket is used to seal the junction between flanges, such as between pipes. In such applications, expanded PTFE is a desirable material for the gaskets because the expanded PTFE gasket can be placed between the flanges, and the flanges can then be pressed together with the application of force, such as by tightening of bolts. This application of force compresses the expanded PTFE. As the expanded PTFE is compressed, its initial pore volume is reduced, thus densifying the expanded PTFE. Particularly with metal-to-metal flanges, it is possible to apply sufficient force (or "stress") to the flanges to fully densify the expanded PTFE. Thus, in at least part of the expanded PTFE gasket, the pore volume is reduced to substantially zero, such that a fluid contained within the pipes is prevented from leaking between the flanges by the densified expanded PTFE gasket, which seals the flanges.

In many applications, particularly when harsh chemicals are used which would readily breakdown metal which could contaminate the chemical which is being transported or housed, it is common to use glass-lined steel, glass, or fiberglass reinforced plastic ("FRP") piping and vessels. Because this equipment is often used with extremely harsh chemicals, there is great desire to use PTFE gaskets to seal the connecting flanges of this equipment because of the well known extraordinary chemical resistance of PTFE. Unfortunately, non-expanded, non-porous PTFE gaskets may not be conformable enough to effectively seal this type of equipment. In the case of glass-lined steel flanges, although there is a relatively smooth finish, there is often a large amount of unevenness or lack of flatness associated with the flanges. This unevenness or lack of flatness requires the gasket to conform to large variations around the perimeter as well as between the internal and external diameter of the flange in order for an effective seal to be created. It would be desirable to use a conformable expanded PTFE to seal these commonly uneven flanges.

In many applications it is not possible to apply sufficient force to the flanges to create enough gasket stress to sufficiently densify the expanded PTFE gasket to create an effective seal. For example, glass-lined steel piping flanges, glass flanges, or FRP piping flanges may deform, fracture, or break upon the application of a high amount of stress. In these applications, an expanded PTFE gasket may not become leak proof because the maximum stress that can be applied to the flanges without breaking them may not be sufficient to densify the gasket to a non-porous state. Where the expanded PTFE gasket is not sufficiently densified, leakage can occur through the residual porosity within the gasket. In such cases and where corrosive chemicals are being processed, a leak may persist undetected for months or years until the corrosive chemicals eventually leak through the gasket and attack uncoated areas on the outside of a flange resulting in severe damage to the flange. If gone unnoticed for a long enough period of time, the chemical attack on the outside of the flange can result in a catastrophic failure of the gasketed joint.

U.S. Pat. No. 6,485,809, in the name of Minor et al., teaches a low stress to seal gasket construction which provides a substantially air tight, or air impermeable, seal upon the application of a relatively low stress. One embodiment is a multilayer, unitary gasket having at least one inner layer of expanded PTFE disposed between a first substantially air impermeable outer layer and a second substantially air impermeable outer layer, and a substantially air impermeable region bridging the first and second substantially air impermeable layers. Gaskets are stamped or cut from multilayered laminated sheets formed by wrapping layers around a mandrel, and are subjected to compressive treatment to compress a discreet portion forming an air impermeable region. While this patented construction may overcome many challenges in creating a low stress to seal gasket, the size of the gasket that can be produced when cutting from sheet gasketing is limited to the sheet size itself. Also, tooling costs for large size gaskets can be quite expensive and the manufacturing efficiencies of cutting gaskets from sheet stock can be relatively low especially with large diameter gaskets, where much of the sheet is scrapped.

U.S. Pat. No. 5,964,465 to Mills et al. teaches a biaxially expanded PTFE form-in-place type gasket having the advantage of being able to be formed to any size flange without the limitations of gaskets cut from sheet stock. Form-in-place gaskets made in accordance with the teachings of Mills et al., comprised of biaxially expanded PTFE, may have additional advantages offered by the biaxially expanded PTFE such as chemical resistance, dimensional stability, and resistance to creep relaxation. However, as previously noted, in many applications adequate gasket stress cannot be applied to sufficiently densify the ePTFE, therefore, these gaskets cannot effectively seal glass lined steel and FRP flanges.

In PCT publication WO01/27501 A1 to Dove et al., a form-in-place gasket comprising an inner layer of expanded PTFE and substantially air impermeable outer layers that are bridged by a substantially impermeable region is taught. While the substantially air impermeable outer layers and substantially air impermeable region are intended to prevent permeation through the expanded PTFE gasket material, gaskets constructed according to the teachings of WO01/27501 are subject to a number of disadvantages. For example, gaskets having a substantially air impermeable region bridging the first and second substantially air impermeable layers along the inner or outer perimeter of the formed gasket may be susceptible to leakage at the overlap of the two ends of the form-in-place gasket. In glass lined steel flanges, it is common that there is a curvature in the radial direction of the flange across the width of the flange. This results in a stress concentration towards the center of the gasket which also results in a minimal amount of stress being applied to the outer edges of the gasket. As a result, process fluids can penetrate into or out of the gasket through the exposed porosity at the overlap of the two ends. Moreover, where the substantially air impermeable region is located between outer edges of the gasket as shown in FIGS. 11 and 12 of WO01/27501, such gasket constructions are susceptible to fracturing at the overlap of the two ends of the gasket. Even at relatively low bolt loads the stress on the overlap where two impermeable regions are stacked on one another may exceed the fracture point of the ePTFE causing the gasket to rupture at this location. The integrity of the gasket at the point of rupture is lost and a leak path may result causing the gasket to fail.

In U.S. Patent Publication No. 2003/0003290 A1 to Hisano et al., a sealing material in the form of a tape is taught having laminated layers of porous expanded PTFE slit into strips having a height greater than the width. In use the laminated end faces on the long side of the strips are oriented to be in contact with the tightening surface. A plurality of the laminated strips may be joined together on the laminated surfaces with tetrafluoroethylene-hexafluoropropylene copolymer or tetrafluoroethylene-perfluoroalkyl vinyl ether copolymer film. It is further taught that at least one layer may be interposed within the laminate for preventing fluid penetration. The longitudinal beginning and end of the tape are joined to form a gasket, and the layers of expanded PTFE and the layer for preventing fluid penetration are vertically oriented when the gasket is installed on a flange surface. The layers for preventing fluid penetration are intended to prevent leakage in the radial direction through the porous ePTFE, thus providing a low stress to seal gasket by eliminating the need to apply sufficient stress to densify the porous ePTFE. For gaskets made according to this method the ePTFE layers are laminated in the width direction of the gasket. The transverse directional strength of the ePTFE is oriented in the vertical or z-axis direction of the gasket. Therefore, little strength is provided to the gasket in the radial direction. Therefore, gaskets taught in U.S. Patent Publication No. 2003/0003290 A1 may be prone to cold flow in the width direction and lack dimensional stability. Therefore, it is desirable that the plane of expansion of biaxially or multiaxially expanded PTFE gaskets be substantially parallel to the x-y plane of the gasket to provide dimensional stability and resistance to cold flow.

It would be desirable to provide a unitary, chemically resistant, dimensionally stable, high strength form-in-place gasket that can seal large diameter openings, especially glass-lined steel and FRP equipment flanges, upon the application of a relatively low compressive load. It is further desirable for a form-in-place gasket to be relatively flexible and can be installed using the common skive cutting techniques for overlapping the ends of the tape. Accordingly, several embodiments of an expanded PTFE form-in-place gasket material that overcome many of the limitations of the previous inventions are presented below.

SUMMARY OF THE INVENTION

In use, gaskets are subjected to the application of stress which results when two mating flanges are bolted together. The stress is applied substantially perpendicularly to the gasket surfaces. Upon application of this stress, porous PTFE compresses, thereby reducing the porosity of the porous PTFE to prevent leakage between the flanges. Gaskets of the present invention are suitable for use in applications such as in glass lined steel equipment flanges or fiber glass reinforced plastic equipment flanges where the applied gasket stress is not sufficient to reduce the porosity in the porous PTFE to substantially a non-porous state. In such applications, traditional porous expanded PTFE form-in-place gaskets are susceptible to penetration leakage through the residual porosity in the ePTFE which results in unacceptable levels of leakage.

Gaskets of the present invention are formed from multi-layer gasket material comprising at least two stacked tapes of porous PTFE. The tape material further comprises substantially air impermeable layers and densified regions that create an air impermeable barrier substantially continuous from the upper gasket surface to the lower gasket surface. This barrier prevents fluid from being able to penetrate through the width of the gasket from the inner perimeter to the outer perimeter of the gasket. In this manner, the inventive gasket can provide very low and acceptable levels of leakage when relatively low loads are applied to the gasket. Further, a fluid may penetrate into the porous ePTFE region along the inner perimeter of the gasket but is substantially blocked by the barrier formed from the densified region and the substantially air impermeable layers from being able to fully penetrate across the entire width of the gasket. Gaskets of the present invention also exhibit excellent dimensional stability, chemical resistance, and fracture resistance.

BRIEF DESCRIPTION OF THE DRAWINGS

FIG. 7 is a side view of a fixture and method for forming a densified region in a porous PTFE composite tape layer.

FIG. 8a is a perspective view of a component of a fixture for forming a densified region in a porous PTFE composite tape layer.

FIG. 8b is a perspective view of a component of a fixture for forming a densified region in a porous PTFE composite tape layer.

DETAILED DESCRIPTION OF THE INVENTION

One embodiment of the present invention is a porous PTFE form-in-place gasket that provides a seal with a low level of leakage upon the application of a relatively low load to components that are joined or sealed by the gasket. Gaskets of the present invention are particularly well suited for sealing large diameter openings, such as glass-lined steel and FRP equipment flanges with relatively low compressive load. By "low compressive load" is meant a load or force applied to the gasket surfaces resulting in a compressive stress below that required to densify a porous expanded polytetrafluoroethylene (ePTFE) gasket to a substantially non-porous state, generally less than about 20,700 kPa (3000 psi). Gaskets of the present invention are "low stress to seal" meaning that the sealing stress necessary to achieve a desired seal is less than about 20,700 kPa (3000 psi). Methods are disclosed for forming the low stress to seal gaskets of the present invention.

Gaskets of the present invention are particularly well suited as form-in-place gaskets. By "form-in-place" is meant a gasket formed from material provided as a narrow, flexible, continuous strip (i.e. tape or cord) to be cut to an appropriate length and shaped to the geometry of the sealing surface. For example, a form-in-place gasket suitable for use with a glass-lined steel flange of a vessel may be provided as a flexible tape that is bent into a shape matching the perimeter of the flange. Adhesives are typically used to hold the gasket against the flange during installation until a mating flange is secured compressing the gasket between the two flanges.

Figure 1:
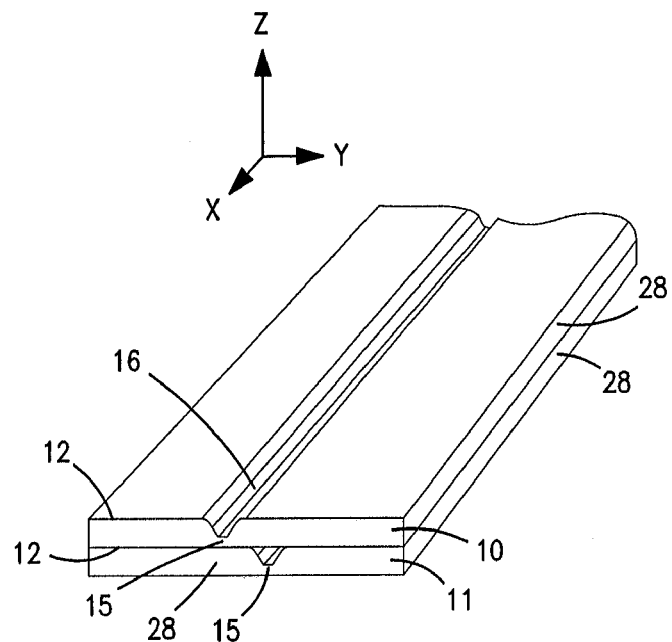
FIG. 1 is a perspective view of a composite low stress to seal gasket material of the present invention and orientation.
Figure 1A:
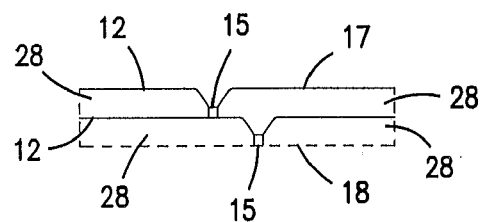
FIG. 1a is a cross-sectional view of the substantially air impermeable barrier of the gasket material of FIG. 1.

An exemplary embodiment of the present invention is shown in FIG. 1. In this embodiment, the multilayer form-in-place gasket material comprises two porous PTFE tapes 10 and 11 having substantially air impermeable layers 12 disposed on the top tape surfaces extending the length (x-axis direction) and the width (y-axis direction) of each tape. The substantially air impermeable layer of the lower tape of FIG. 1 forms an interface between the tape layers. The two tapes each comprise a densified region 15 that extends the length (x-axis) of the tape. The porous PTFE is densified through the thickness (z-axis) of the tape to a substantially non-porous state having a density of at least about 1.8 g/cc. As illustrated by FIG. 1a the densified region 15 of each tape defines a substantially non-porous region 15 that separates porous PTFE tape regions 28. The non-porous region 15 and porous regions 28 extend the length of the tape (FIG. 1). The PTFE layer(s) 19 having both densified regions 15 and porous regions 28 are continuous across the width (y-axis direction) of the tape material as illustrated in FIG. 2.

Figure 2:
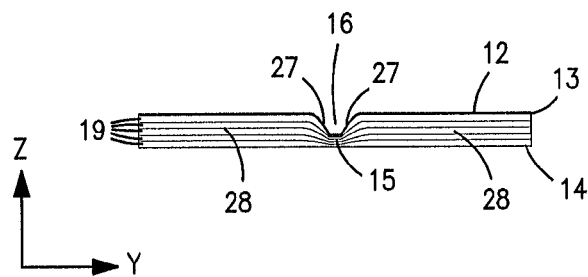
FIG. 2 is a cross-sectional view of a single tape layer of gasket material of the present invention having one densified region and a top impermeable layer.
Figure 4:
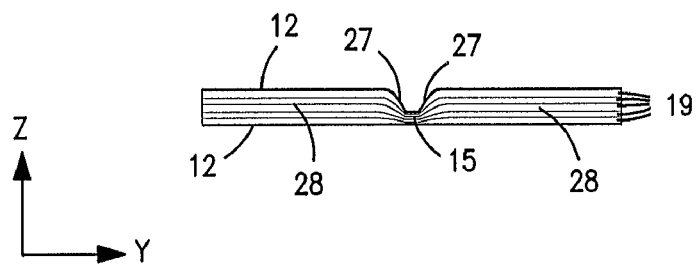
FIG. 4 is a cross-sectional view of a single tape layer of a gasket material of the present invention having one densified region and a top and bottom impermeable layer.

FIG. 2 illustrates one embodiment of the porous tape 10 component used to form the multilayer gasket material of the present invention shown in FIG. 1. The single tape shown in FIG. 2 comprises multiple layers of porous expanded PTFE (ePTFE) 19 extending the width of the gasket material. A substantially air impermeable layer 12 is disposed on a top tape surface 13 extending the tape length. Optionally, the bottom tape surface 14 may also comprise a substantially air impermeable layer 12 (FIG. 4). A region of the multiple layer expanded PTFE tape is compressed to near full density (i.e. density greater than about 1.8 g/cc) in the thickness direction (z-axis) forming a densified region 15 and a channel 16 both extending the length of the tape. The densified regions 15 of, for example, FIGS. 1 and 2 may be formed by compressing the porous PTFE tape in the z-axis (thickness) direction from the top tape surface 13 towards the bottom tape surface 14. Thus, the nonporous region of each tape extends from the top tape surface 13 to the bottom tape 14 surface. The tape is compressed for the length of the tape forming a channel 16 that extends the length (x-axis) of the tape. The substantially air impermeable layer 12 is disposed on the top tape surface 13 and on channel side surfaces 27 (FIG. 2) to inhibit penetration of fluid through the channel side surfaces which may remain porous. One or more of the tape components may optionally comprise more than one densified, substantially non-porous region extending the tape length.

The gasket according to FIG. 1 comprises two tapes 10 and 11 that are stacked, and joined by a substantially air impermeable layer 12 forming an interface between a top tape surface of one tape 11 and the bottom tape surface of the other tape 10. The substantially air impermeable layers 12 and densified regions 15 together form a substantially air impermeable barrier (FIG. 1a) that is continuous through the thickness of the gasket from the upper gasket surface 17 to the lower gasket surface 18 along the length of the tape. The barrier resists the flow of fluid from one porous region to another thereby inhibiting penetration leakage through the gasket in the radial direction. By providing a substantially air impermeable barrier that inhibits penetration leakage through the porous regions 28 of the PTFE and channel side surface 27, gaskets of the present invention seal at relatively low compressive loads. By "penetration leakage" is meant leakage or flow of fluid through the gasket in the width direction between the upper gasket surface and lower gasket surface.

Figure 3:
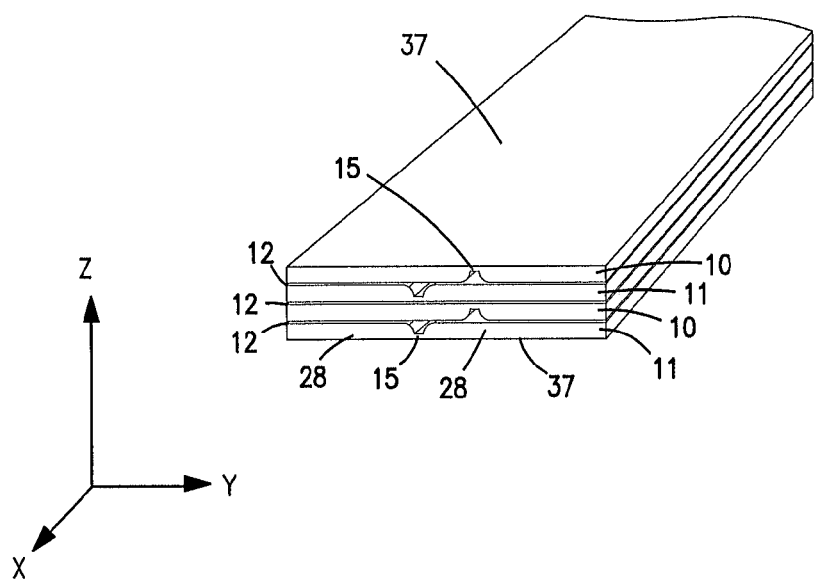
FIG. 3 is a perspective view of a gasket material of the present invention comprising four tape layers and orientation.
Figure 5:
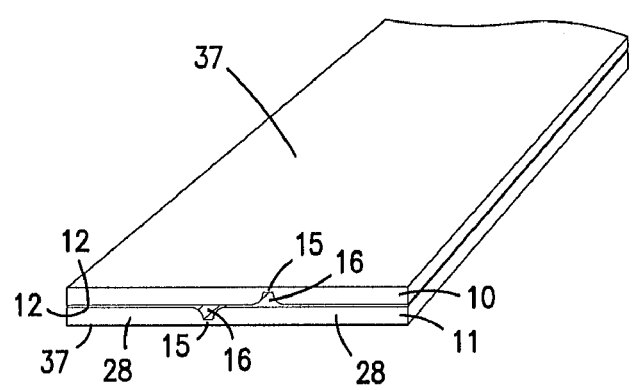
FIG. 5 is a perspective view of a gasket material of the present invention.

Exemplary embodiments of the present invention having at least two adjoined tapes 10 and 11 are illustrated by FIGS. 1, 3, and 5. At least two tapes are stacked to form the gasket material. The densified regions forming substantially non-porous regions 15 of at least two tapes 10 and 11 are not substantially aligned in the z-axis direction. Porous PTFE regions 28 above and/or below densified regions 15 of adjoining tapes provide compressibility to the gasket and greater conformability of the gasket to non-uniform surfaces of flanges thereby providing a tight seal at low load. Staggering the densified regions in the inventive multilayer gasket also inhibits fracturing of the densified regions of the tape at the overlap of the two ends of the tape.

FIG. 5 illustrates a gasket material of the present invention having two adjoined tapes 10 and 11 each having a substantially air impermeable layer 12 disposed on a top tape surface having a channel 16. In the gasket material according to FIG. 5 the two tapes are adjoined at top tape surfaces by the substantially air impermeable layers 12 which extend the length of the tape; the substantially air impermeable layers 12 are positioned to form an interface between upper and lower tapes 10 and 11. Each tape has a densified region 15 extending the length of the tape (x-axis direction) and two porous PTFE regions 28 wherein the densified region is disposed between and separates the two porous regions for the length of the tape. Densified regions 15 of the two tapes 10 and 11 are not substantially aligned in the z-axis direction for the length of the tape. Upper and lower gasket surfaces 37 of the gasket material of FIG. 5 may be comprised of porous PTFE. Optionally, one or both of the upper or lower gasket surfaces may comprise a substantially air impermeable layer.

FIG. 3 illustrates an alternate embodiment of the present invention having four layers of tape 10 and 11. Substantially air impermeable layers 12 are on top tape surfaces 13 (FIG. 2) and channel surfaces 27 and 16 (FIG. 2) and form interfaces between the tapes 10 and 11. Non-porous regions (15) separate porous regions 28 of each tape in the y-axis direction, and the non-porous regions of at least two tapes are not substantially aligned in the z-axis direction. In FIG. 3, non-porous regions of adjacent tape layers of at least two tapes are alternating through the z-axis direction of the tape. Upper and lower gasket surfaces 37 comprise porous PTFE, or optionally, one or both upper and lower gasket surfaces 37 comprise a substantially air impermeable layer.

Lengths of porous PTFE tape suitable for use in the present invention are formed from either a single monolithic layer of porous PTFE or from a plurality of expanded PTFE (ePTFE) layers 19 (FIGS. 2 and 4). PTFE layers suitable for use in the present invention comprise a width of PTFE material which extends substantially continuously for the entire width (y-axis direction) of the gasket. Preferred porous expanded PTFE comprises microporous expanded PTFE as taught in U.S. Pat. Nos. 3,953,566 and 4,187,390, incorporated herein by reference. The ePTFE may comprise multiple layers of uniaxially, biaxially, or multiaxially expanded PTFE, or combinations thereof. Preferably, porous ePTFE has a density of less than 1.8 g/cc, more preferred less than 1.2 g/cc, further preferred less than 1.0 g/cc, and a most preferred density of less than 0.8 g/cc. While each tape is not limited by the number of porous ePTFE layers, preferred ePTFE tape is formed from multiple self-adhered porous ePTFE layers made by any method known in the art for forming multilayered porous ePTFE tapes; methods suitable for use in the present invention are described, for example, in U.S. Pat. No. 5,964,465 which is hereby incorporated herein by reference. Suitable ePTFE tape for use in making multilayered gasket of the present invention is commercially available, for example, under the trade names GORE-TEX® Gasket Tape, GORE-TEX® Series 300 Gasket Tape and GORE-TEX® Series 600 Gasket Tape (W.L. Gore & Assoc., Inc., Elkton, Md.).

Multilayer gasket of the present invention may comprise uniaxially, biaxially or multiaxially expanded PTFE tapes, or combinations thereof. Preferred are biaxially and multi-axially expanded PTFE tapes which offer resistance to creep and cold flow in the transverse direction of the tapes when the plane of expansion of the ePTFE is substantially parallel to the x-y plane of the gasket.

At least a portion of the porous ePTFE tape, or at least one layer of multilayered ePTFE tape, may be coated or contain additional materials or fillers to provide desired properties to the gasket provided the desired level of flexibility is not compromised. Expanded PTFE may be coated to provide properties such as resilience, electrochemical responsiveness, added strength, further reduced creep relaxation, and the like. Additionally, porous ePTFE may be filled with various fillers, for example, such as those used to fill microporous ePTFE sheets as taught in U.S. Pat. Nos. 4,096,227 and 4,985,296, incorporated herein by reference. Suitable particulate fillers may include, for example, inorganic materials such as metals, semi-metals, metal oxides, glass, ceramic and the like. Alternatively, other suitable particulate fillers may include, for example, organic materials selected from activated carbon, carbon black, polymeric resin, graphite and the like. In one preferred embodiment, at least one layer of multilayered porous expanded PTFE tape comprises at least one filler. Preferably, the at least one filler comprises at least one of silica, barium sulfate and glass beads.

One or more tapes comprising multiple layers of ePTFE may further comprise layers of materials other than expanded PTFE to achieve desired properties. For example, one or more polymeric films, metal foils, metal screens or the like may be incorporated in the multilayer ePTFE tape to enhance desired gasket properties.

The substantially air impermeable layer 12 as illustrated in FIGS. 2 and 4 is provided to the top tape surface and optionally, the bottom tape surface. By "substantially air impermeable" as used herein is meant more resistant than the porous PTFE of the porous PTFE tape to the transport of air through a material. Permeability may be measured using any known technique, such as ASTM D-1434-82 (2003). The substantially air permeable layer is applied to porous tape surfaces such as channel side surfaces 27, the top tape surface 13, and optionally both the top and bottom tape 14 surfaces. The air impermeable layer extends the length of the tape, and preferably the layer extends across the tape width. Suitable materials for use as the substantially air impermeable layer comprise fluoropolymers such as tetrafluoroethylene/hexafluoropropylene copolymer (FEP), tetrafluoroethylene/(perfluoroalkyl) vinyl ether copolymer (PFA), skived PTFE, densified ePTFE, and combinations thereof. In a preferred embodiment a multilayer gasket is formed from at least two stacked ePTFE tapes joined by a melt processible fluoropolymer such as FEP, PFA or the like, which forms the substantially air impermeable layer. The substantially air impermeable layers should be thick enough to provide adequate resistance to permeation through the layer, without rendering the gasket inflexible for its intended purpose. In the embodiments of the present invention as illustrated in FIG. 2 and FIG. 4 where the top and/or bottom gasket surfaces comprise a substantially air impermeable layer, it is important that the layer be thin enough to maintain the conformability and flexibility of the gasket. Substantially air impermeable layers having a thickness of about 0.05 mm or less are preferred, thickness of about 0.03 mm or less are more preferred, and thickness of about 0.02 mm or less are further preferred.

Preferred form-in-place gaskets easily bend to the required geometry of the flange surface on which the gasket is to be installed, while providing adequate resistance to penetration leakage. To maintain the conformability and flexibility of the gasket, it is desirable to minimize the width and thickness of the densified, non-porous regions in each ePTFE tape. The densified non-porous regions of the present invention extend from top tape surface to bottom tape surface and preferably have a width of less than about 4 mm, more preferred less than about 3 mm, further preferred less than 2 mm, and most preferred have a width of about 1 mm or less. Furthermore, it is desirable for the width of the densified region to be less than the thickness of the densified region which allows for enhanced bending of the densified region during gasket installation. Minimizing the depth of the channel formed by compressing the PTFE relative to the overall thickness of the gasket is also an important feature of the gaskets of the present invention. The thickness of the densified regions and the depth of each channel formed by compressing a porous PTFE tape are related to the initial thickness and density of the tape. For example, a porous PTFE tape having an initial density of about 0.6 g/cc, can be reduced to a thickness of about one-third or more of the original tape thickness to achieve a density of at least about 1.8 g/cc in the compressed non-porous region. The depth of the channel that results from compressing the PTFE to full density is about two-thirds of the original thickness of the porous ePTFE tape. Minimizing the thickness of the compressed densified regions and the depth of the channel from each tape relative to the overall thickness of the final gasket material of the present invention is accomplished by constructing the gasket with multiple thin porous PTFE tape layers. In one example, a 6 mm thick ePTFE gasket can be comprised of two 3 mm thick ePTFE tapes or four 1.5 mm ePTFE tapes. A 6 mm thick gasket comprising two 3 mm thick tape layers having an initial density of about 0.6 g/cc and having compressed regions densified to about 1.8 g/cc will have densified regions having a thickness of about 1 mm and a channel depth of 2 mm. In an embodiment where a 6 mm thick gasket comprises four 1.5 mm thick ePTFE tapes, compressed regions densified to about 1.8 g/cc will have a thickness of about 0.5 mm and a channel depth of 1 mm. Individual porous PTFE tapes of the multilayer gasket of the present invention preferably have a thickness of 3 mm or less to minimize the depth of the channel, and the thickness and width of each densified region to optimize conformability and flexibility of the tape.

One method for forming the multilayer form-in-place gasket of the present invention comprises the steps of providing at least two porous PTFE tapes each having a top tape surface and a bottom tape surface, and providing a substantially air impermeable layer on the top tape surface, channel side surfaces and optionally bottom tape surface of each porous PTFE tape. The method further comprises forming at least one substantially non-porous region extending from top tape surface to bottom tape surface disposed between porous regions, and stacking the at least two tapes along tape lengths so that the substantially air impermeable layer on the top and/or bottom surfaces of at least two porous PTFE tapes forms an interface between the tapes. The tapes are aligned so that the top and bottom tape surfaces are in the x-y plane of the gasket, and the substantially non-porous regions of at least two tapes are not substantially aligned in the z-axis direction. The method further comprises joining the at least two ePTFE tapes with at least one substantially air impermeable material at the tape interface.

In the methods of the present invention the porous PTFE tapes may be aligned along tape lengths in a number of configurations. For example, at least two tapes may be aligned along top tape surfaces, bottom tape surfaces or the top tape surface of one tape with the bottom tape surface of another tape, provided that there is a substantially air impermeable layer at the interface of the two tape surfaces.

Figure 6:
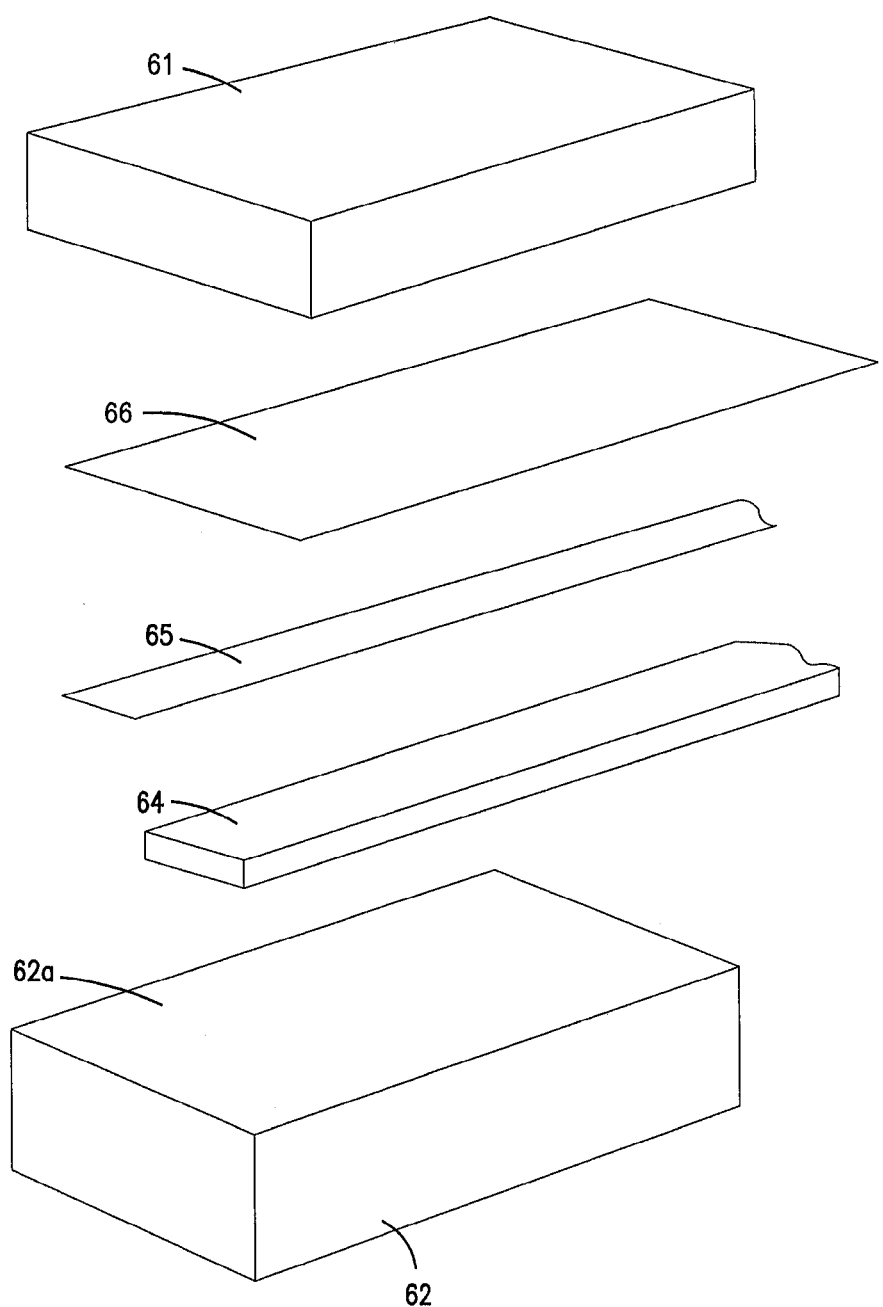
FIG. 6 is an exploded view of a fixture and method of disposing a substantially air impermeable layer on an ePTFE tape.

In a further embodiment, the method comprises the step of bonding the substantially air impermeable layers to the top tape surfaces of the at least two porous PTFE tapes prior to forming the substantially non-porous regions of each tape. The method may further comprise applying heat to the porous PTFE top tape surface and the substantially air impermeable layer, and applying sufficient pressure to bond the top tape surface and the substantially air impermeable layer without significantly reducing the tape thickness and porosity. A release layer may be provided between the material capable of forming the air impermeable layer and the pressure and/or heat source to prevent sticking. The substantially air impermeable material is bonded to a desired length of the porous PTFE tapes, which is preferably the entire tape length. FIG. 6 illustrates a portion of a hot press assembly and method for bonding the substantially air impermeable layer to the upper tape surface.

Alternately, a material capable of forming a substantially air impermeable layer is applied to the porous PTFE top and, optionally bottom surface. The material may, for example, be coated onto the top and/or bottom tape surfaces of the at least two porous PTFE tapes prior to or after forming the substantially non-porous region. Coating may be accomplished by any means such as spraying, brushing or powder coating. Subsequently, the material forms a substantially air impermeable layer, such as during further method steps.

Method steps including contacting the PTFE tape and the at least one material capable of forming a substantially air impermeable layer, applying heat, applying pressure to the material and PTFE tape, and forming a non-porous region may be performed simultaneously or in sequential steps. Further the steps of forming a substantially air impermeable layer and forming a non-porous region on the upper tape surfaces of the at least two porous PTFE tapes may be performed as a step-wise or continuous process along the entire length of the tape.

In one method, a substantially air impermeable layer is formed on the top tape surface of a first porous PTFE tape of the multilayer form-in-place gasket, and to both the top and bottom tape surfaces of each of the remaining at least two porous PTFE tapes in the multilayer form-in-place gasket. The lower gasket surface comprises the bottom tape surface of the first porous PTFE tape. The densified non-porous region is formed in the first porous PTFE tape by compressing the PTFE from the top tape surface. The densified region may be formed in the remaining porous PTFE tapes by compressing along the top tape surface, or along the bottom tape surface, or compressing along both the top and bottom tape surfaces.

A method for forming the substantially non-porous PTFE region along the x-axis of the porous PTFE tapes comprises the step of compressing the porous PTFE tape from the top tape surface towards the bottom tape surface in the thickness direction (the z-axis) to reduce the porosity in a desired region to substantially zero porosity. FIGS. 7 and 8 illustrate portions of a compression assembly suitable for use in the present invention and method for forming a densified region disposed between two porous regions along the length of the PTFE tape. FIG. 2 illustrates the densified region 15 formed between two porous ePTFE regions and a channel that results from compressing the ePTFE in the z-axis. Further, the step of compressing porous PTFE may include applying heat to the PTFE. The step of compressing porous PTFE to form a non-porous region may be performed as a step-wise or continuous process along the entire length of the tape.

Figure 9:
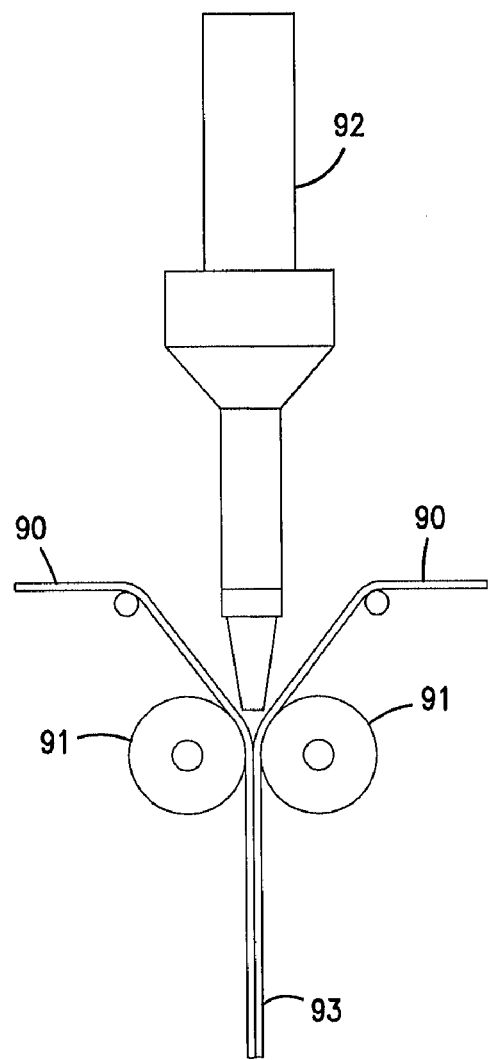
FIG. 9 is a side view of a fixture and method of assembling a multilayer tape.

FIG. 9 illustrates a portion of an assembly for joining the at least two PTFE tapes to form a multilayer form-in-place gasket. The steps of joining the at least two PTFE tapes along tape surfaces having substantially air impermeable layers bonded thereto, include the steps of applying heat at a juncture of the mating surfaces of the at least two PTFE tape surfaces, contacting and applying pressure to the heated PTFE tape surfaces to fuse the substantially air impermeable layers to join the at least two PTFE tapes; these steps may be performed sequentially or simultaneously. Further, the steps of joining at least two ePTFE tapes may be performed step-wise or as a continuous process until the desired length of tape is joined.

Figure 14:
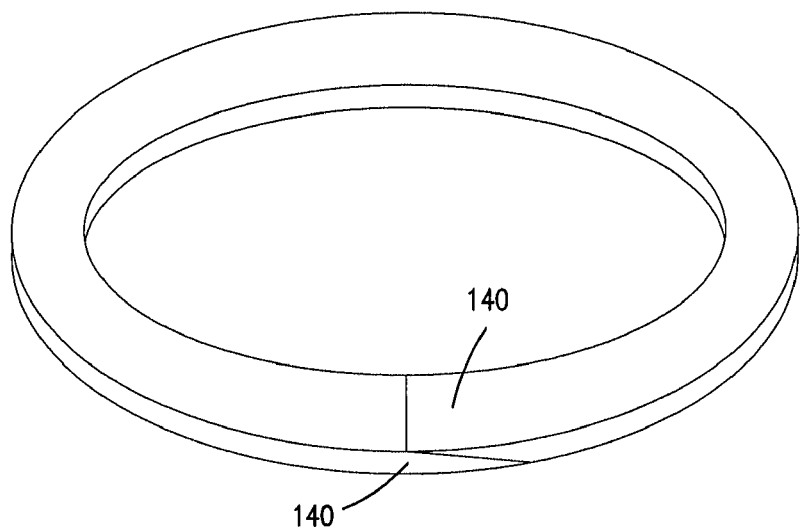
FIG. 14 is a perspective view of a form-in-place gasket and a method for joining two ends of a tape of the present invention.
Figure 14A:
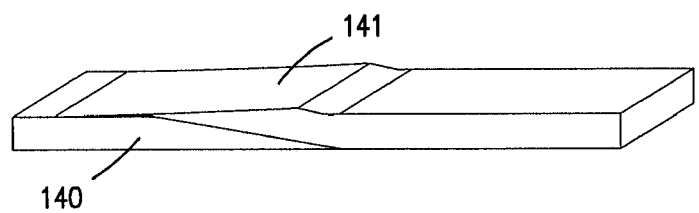

Gaskets of the present invention may be formed in virtually any dimension of importance to sealing applications. Form-in-place gaskets or seals are formed from the gasket material of the present invention by joining the longitudinal tape beginning and end. The ends may be joined by any method known in the art for joining tape material. A preferred method for joining tape ends comprises the method of skiving described, for example, in commonly owned U.S. Pat. No. 5,964,465 to Mills et al. As shown in FIGS. 14 and 14a longitudinal ends 140 and 141 of the multilayer form-in-place gasket are skive cut in diagonal fashion and joined with each other in such a way that the sealing surface is covered entirely and the increase in gasket thickness at the overlap of the two ends is minimized. Alternatively, a seal between longitudinal ends of the form-in-place gasket may be formed by any technique, such as overlapping, or the like, which creates an effective seal.

Test Methods

Sealability Test Procedures

Figure 12:
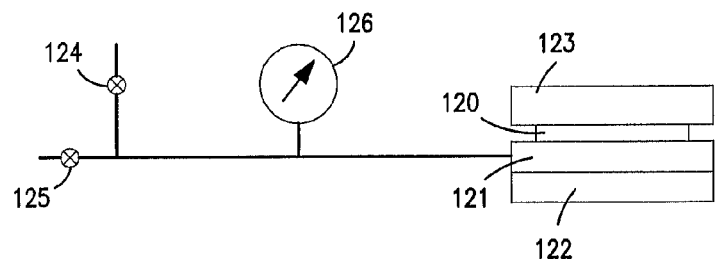
FIG. 12 is a side view of a test apparatus used to measure the sealability of gaskets.

Sealability was demonstrated by measuring leak rates at three different gasket stress levels. The leak rates were calculated based on the pressure drop method. A test fixture substantially similar to that shown in FIG. 12 was used. During the sealability tests, the gaskets were subjected to a compressive load and an internal pressure. The test fluid was air at 620 kPa (90 psi). The gasket size selected for the sealability tests was an inner diameter of about 192 mm, and outer diameter of about 230 mm and a nominal thickness of about 6 mm. The leak rate was calculated based on the difference between the initial mass of air in the test fixture and the final mass of air according to the following equation:

$$\text{Leak Rate (mg/meter/sec)} =$$
$$(m_f - m_i)/(\text{average circumference in meters})/t_{dwell}$$

where:

$m_f = \text{final mass} = P_f V / RT_f$ $P_f = \text{final pressure}$ $T_f = \text{final temperature}$ $m_i = \text{initial mass} = P_i V / RT_i$ $P_i = \text{initial pressure}$ $T_i = \text{initial temperature}$ average circumference = the average circumference of the gasket based on the $$\text{average diameter} = \pi \times [(OD + ID)/2] = 0.663 \text{ meters}$$

average circumference=the average circumference of the gasket based on the average diameter=π× [(OD+ID)/2]=0.663 meters $t_{dwell}$=test dwell time (seconds)

The initial and final mass of air was determined based on the initial and final internal pressures and temperatures through the use of the Ideal Gas Law, m=PV/RT, where:

$m = \text{mass (mg)}$ $P = \text{pressure} (kPa)$ $V = \text{volume(ml or cm}^3\text{)}$ $R = \text{gas constant, } (0.2869 kPa \cdot \text{ml/mg} \cdot K \text{ for air})$ $T = \text{temperature} (K)$ The total system volume is equal to the sum of the test fixture volume and the volume defined by the gasket inner diameter and compressed thickness. The volume of the test fixture was determined to be about 45.15 ml. The inner diameter of each test gasket was about 192 mm. The compressed thickness of the gaskets was measured during each part of the sealability test by measuring the gap between the upper platen and the test plate. The total system volume in each part of the tests was calculated using the following equation:

$$V = 45.15 \text{ ml} + [\pi \times (ID/2)^2 \times t]$$

where:

-continued $V = \text{total system volume of the test system, (ml or cm}^3\text{)}$ $\pi = \text{pi or } 3.141$ $ID = \text{gasket inner diameter (cm)}$ $t = \text{compressed gasket thickness (cm)}$ The sealability test consisted of three parts wherein the leak rates were measured at three different gasket stresses:

|        | Gasket Load, kN (lbs.) | Ave. Gasket Stress, MPa (psi) |
|--------|------------------------|-------------------------------|
| Part 1 | 64.5 (14,500)          | 5.12 (750)                    |
| Part 2 | 130.3 (29,292)         | 10.34 (1500)                  |
| Part 3 | 173.8 (39,072)         | 13.79 (2000)                  |

The load applied to a test gasket was calculated based on the nominal gasket area which was based on the nominal initial inner and outer diameters of the gasket where:

Gasket Load $(kN) =$

Average Gasket Stress $(MPa) \times$ Gasket Area $(m^2)/(1 \times 10^3)$ where: Gasket Area $= \pi \times [(OD/2)^2 - (ID/2)^2] = 12{,}595 \text{ mm}^2 = 0.0126 \text{ m}^2$ where:

$\pi = \text{pi or } 3.141$ $OD = \text{gasket outer diameter} = 230 \text{ mm}$ $ID = \text{gasket inner diameter} = 192 \text{ mm}$ The gaskets were initially installed on the test plate. To insure centering of the gaskets on the test plate, a circle having a diameter of about 192 mm (7.562 inches) was drawn with a marker on the top surface of the test plate and centered relative to the edges of the test plate. The circle was redrawn before each test. The form-in-place type gaskets were installed using the skive cut overlapping technique taught in U.S. Pat. No. 5,964,465 to Mills et al. The first end of the form-in-place samples were skive cut on a diagonal with a skive length of about 25 mm. An adhesive layer provided on the bottom surface of the form-in-place gaskets held the material in position as the gasket was being formed to the circular configuration using the circle drawn on the test plate as a guide. The trailing end of the form-in-place gasket was positioned on top of the skive cut on the leading end. The second skive cut was made on the trailing end of the gasket so that an overlap of the two ends was created where the thickness at the overlap was not greater than 20% more than the gasket thickness. The test gaskets of the ring gasket type were positioned on the test plate using the drawn circle as a guide to center the gasket on the test plate.

After a gasket was installed on the test plate, the test plate 121 and gasket 120 were loaded into the platen press and positioned on the lower platen 122 so that it was centered. The prescribed load was applied to the platens 122 and 123. After waiting for 1 minute, the prescribed load was reapplied. With valve 124 closed, the test fixture was pressurized with compressed air to a pressure of about 620 kPa as recorded by the pressure gage 126. The air inlet valve 125 was then closed. The initial pressure and room temperature were recorded. The gap between the upper platen and test plate was measured using a feeler gage and recorded as the compressed thickness of the gasket. The dwell time for determining the leak rate was dependent on the rate of pressure drop. For gaskets with high leak rates, or fast rates of pressure drop, the dwell time was relatively short to minimize the overall pressure drop. For gaskets with lower leak rates, the maximum dwell time was about 30 minutes. After the required dwell time at pressure, the final pressure and temperature were recorded. The internal pressure was drained from the test fixture. The leak rate was calculated using the above equations. The above procedures were repeated for the other two load levels without removing the gasket from the platen press.

Figure 13A:
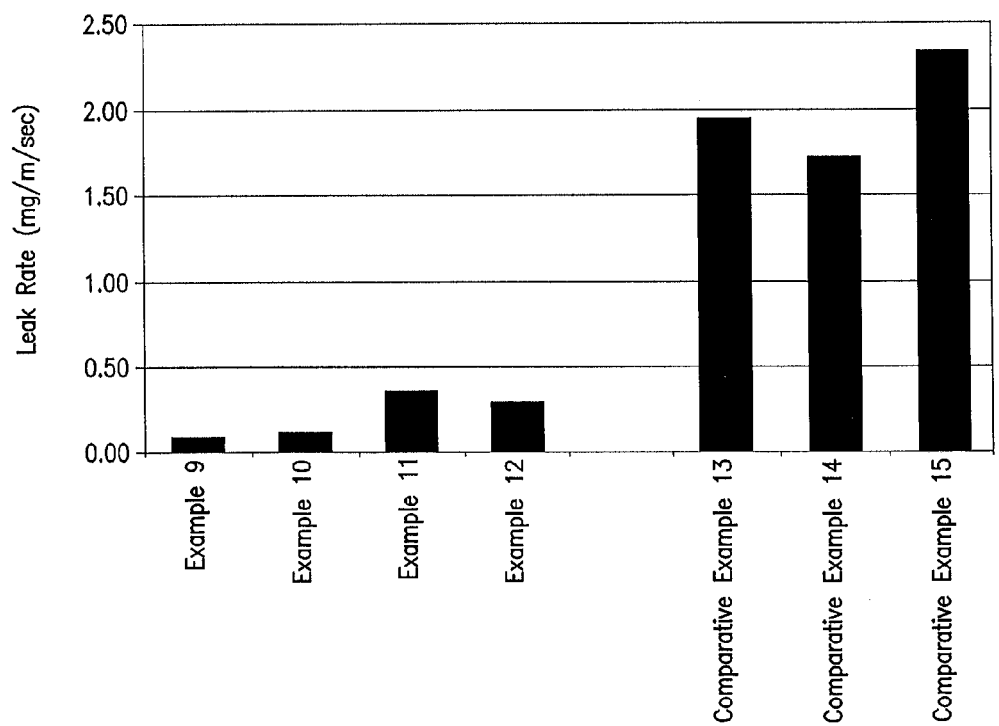
FIGS. 13a-c are graphical representations of leak rate results from the Sealability Test.
Figure 13B:
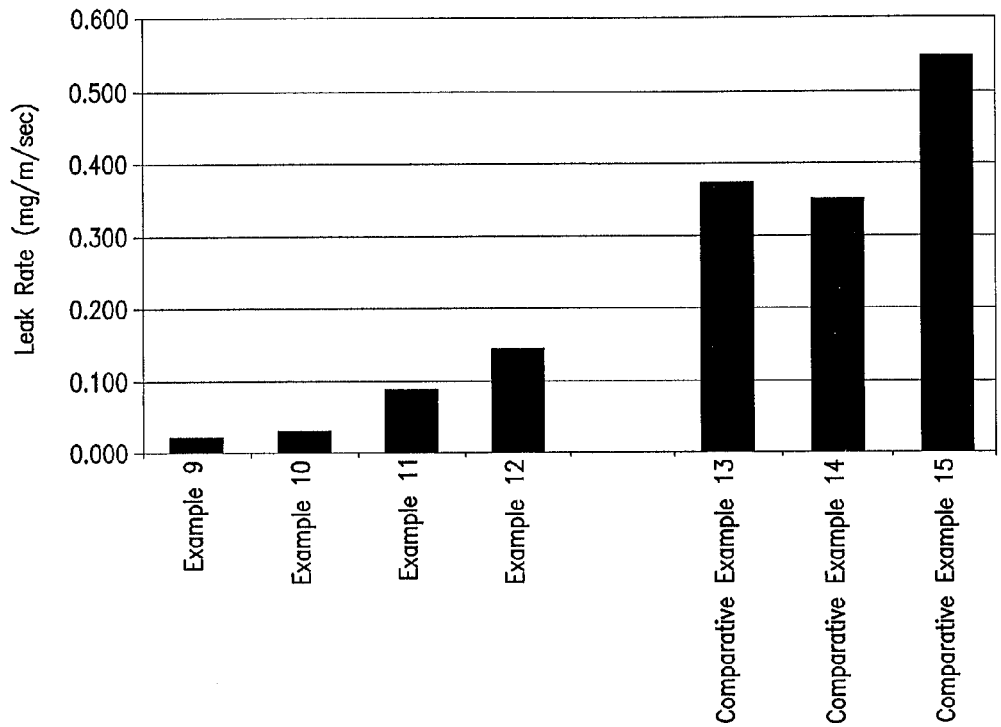
Figure 13C:
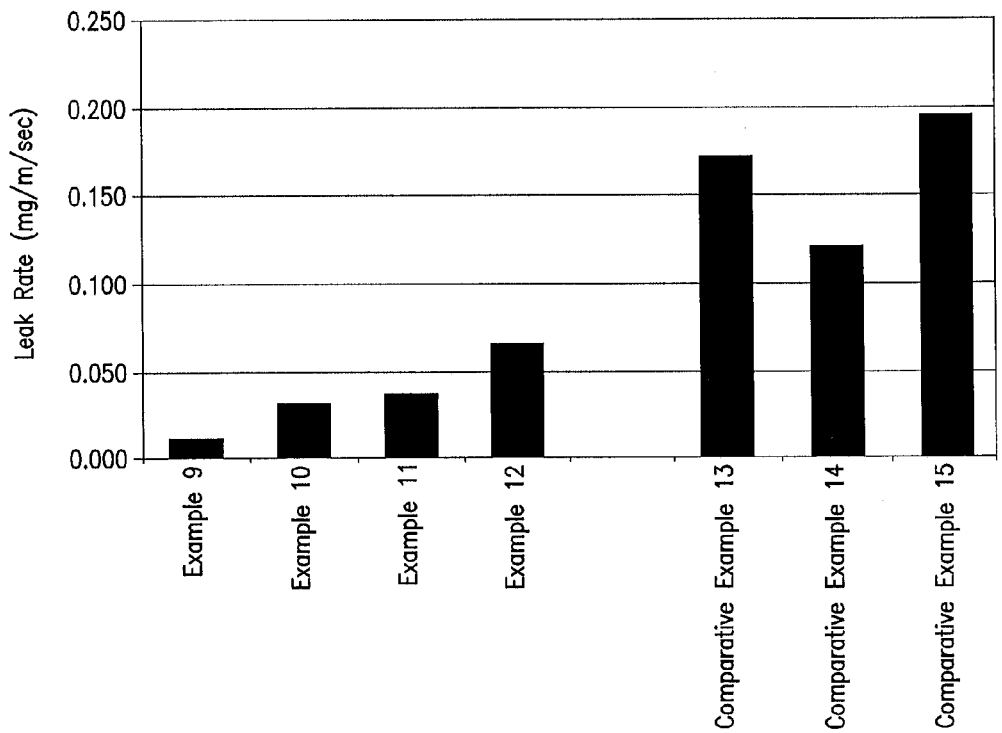

The sealability test above was conducted on samples prepared substantially according to Examples 9-12 and Comparative Examples 13-15. The leak rates for each example can be seen in Table 1 and FIGS. 13a-13c which correspond to Tables 1a-1c, respectively. The results show that at each level of gasket stress Examples 9-12 had lower leak rates than Comparative Examples 13-15 which are comprised of porous ePTFE.

TABLE 1a

Leak Rate of Gaskets at 5.12 MPa Stress.

Gasket Stress = 5.12 MPa

|  | Initial Thickness (inches) | Initial Thickness (cm) | Initial Pressure (kPa) | Initial Temperature (K) | Final Pressure (kPa) | Final Temperature (K) | Dwell Time (minutes) | Leak Rate (mg/m/sec) | Compressed Thickness (inches) |
|---|---|---|---|---|---|---|---|---|---|
| Example 9 | 0.218 | 0.554 | 625.7 | 296.4 | 553.0 | 295.8 | 30.0 | 0.088 | 0.109 |
| Example 10 | 0.218 | 0.554 | 635.7 | 295.8 | 548.6 | 296.3 | 30.0 | 0.114 | 0.116 |
| Example 11 | 0.253 | 0.643 | 631.6 | 296.2 | 293.9 | 295.6 | 39.0 | 0.360 | 0.130 |
| Example 12 | 0.218 | 0.554 | 617.1 | 295.0 | 412.4 | 294.5 | 30.0 | 0.299 | 0.140 |
| Comparative Example 13 | 0.262 | 0.665 | 634.3 | 296.3 | 284.9 | 296.4 | 7.5 | 1.961 | 0.132 |
| Comparative Example 14 | 0.26 | 0.660 | 620.5 | 296.5 | 325.9 | 296.5 | 7.0 | 1.733 | 0.128 |
| Comparative Example 15 | 0.262 | 0.665 | 628.8 | 295.8 | 360.3 | 295.8 | 5.0 | 2.369 | 0.141 |

TABLE 1b

Leak Rate of Gaskets at 10.34 MPa Stress.

Gasket Stress = 10.34 Mpa

|  | Initial Thickness (inches) | Initial Thickness (cm) | Initial Pressure (kPa) | Initial Temperature (K) | Final Pressure (kPa) | Final Temperature (K) | Dwell Time (minutes) | Leak Rate (mg/m/sec) | Compressed Thickness (inches) |
|---|---|---|---|---|---|---|---|---|---|
| Example 9 | 0.218 | 0.554 | 632.9 | 296 | 610.7 | 295.7 | 30 | 0.024 | 0.093 |
| Example 10 | 0.218 | 0.554 | 614.4 | 296.4 | 580.9 | 296.1 | 39 | 0.029 | 0.099 |
| Example 11 | 0.253 | 0.643 | 632.3 | 295.7 | 562.1 | 296.2 | 30 | 0.091 | 0.114 |
| Example 12 | 0.218 | 0.554 | 627.4 | 294.7 | 520.6 | 296.4 | 30 | 0.150 | 0.125 |
| Comparative Example 13 | 0.262 | 0.665 | 628.11 | 296.5 | 382.5 | 295.7 | 25 | 0.375 | 0.115 |
| Comparative Example 14 | 0.26 | 0.660 | 641.9 | 296.4 | 443.9 | 295.8 | 21 | 0.356 | 0.113 |
| Comparative Example 15 | 0.262 | 0.665 | 635 | 295.8 | 495.8 | 296.2 | 10 | 0.557 | 0.121 |

TABLE 1c

Leak Rate of Gaskets at 12.79 MPa Stress.

Gasket Stress = 13.79 MPa

|  | Initial Thickness (inches) | Initial Thickness (cm) | Initial Pressure (kPa) | Initial Temperature (K) | Final Pressure (kPa) | Final Temperature (K) | Dwell Time (minutes) | Leak Rate (mg/m/sec) | Compressed Thickness (inches) |
|---|---|---|---|---|---|---|---|---|---|
| Example 9 | 0.218 | 0.554 | 637.4 | 295.7 | 628.9 | 296.3 | 30 | 0.011 | 0.087 |
| Example 10 | 0.218 | 0.554 | 626 | 296.2 | 597.5 | 295.7 | 30 | 0.030 | 0.092 |
| Example 11 | 0.253 | 0.643 | 630.9 | 296.2 | 599.02 | 296 | 31 | 0.037 | 0.107 |
| Example 12 | 0.218 | 0.554 | 617.2 | 296.3 | 565.8 | 296.4 | 30 | 0.066 | 0.115 |
| Comparative Example 13 | 0.262 | 0.665 | 630.2 | 295.9 | 480.4 | 296.5 | 32 | 0.172 | 0.106 |
| Comparative Example 14 | 0.26 | 0.660 | 635 | 296.4 | 533.5 | 295.8 | 30 | 0.121 | 0.105 |
| Comparative Example 15 | 0.262 | 0.665 | 627.4 | 296.4 | 469.7 | 295.7 | 30 | 0.198 | 0.113 |

Leakage Test Procedure 1

Figure 10:
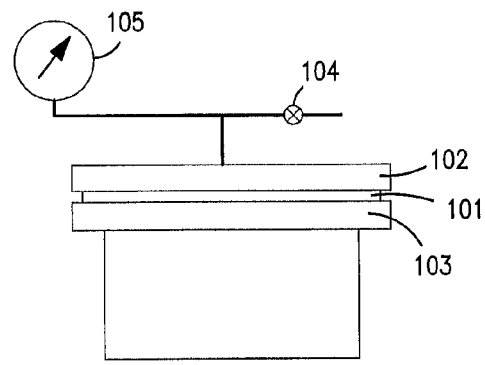
FIG. 10 is a side view of a test apparatus used to measure the leakage of gaskets.
Figure 15:
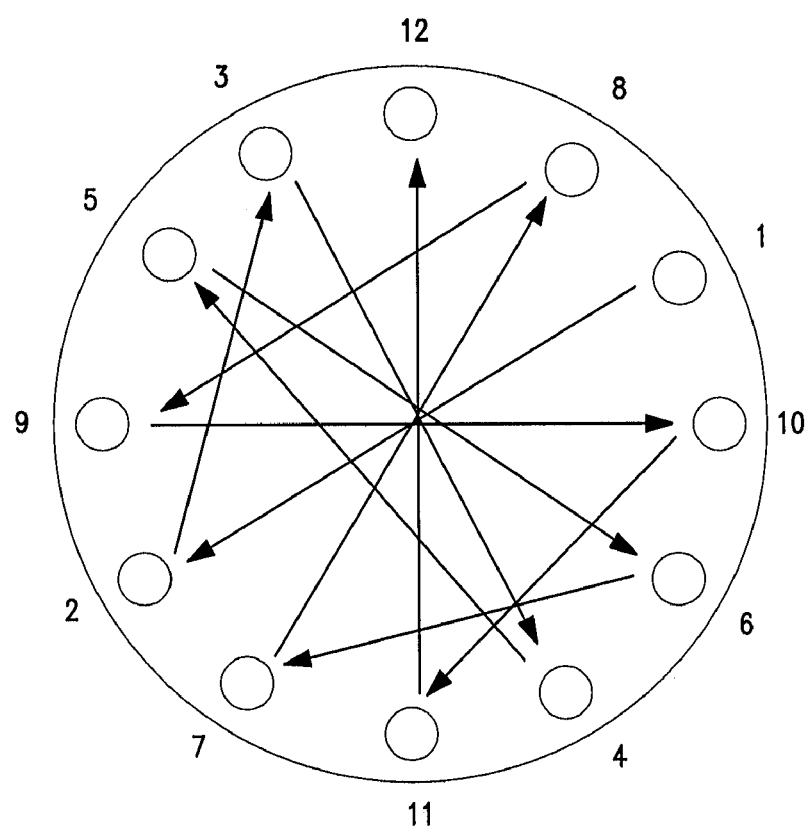
FIG. 15 shows the bolting pattern for the Leakage Tests.

The leakage behavior of gaskets made substantially according to Examples 1, 2 and 16-19 and Comparative Examples 3-8 was tested on a glass lined steel flange test fixture substantially similar to that shown in FIG. 10. The inner and outer diameters of the glass lined steel flanges were approximately 305 mm and 368 mm, respectively. The form-in-place type gaskets 101 were installed on the lower flange 103 using the skive cut overlapping technique taught in U.S. Pat. No. 5,964,465 to Mills et al. The leading end of the gasket samples were skive cut on a diagonal with a skive length of about 40 mm. The release paper was removed from the adhesive on the form-in-place samples. The adhesive layer held the tapes in position as the tape was being formed around the lower flange. The trailing end of the gasket was positioned on top of the skive cut on the leading end of the tape. The second skive cut was made on the trailing end so that an overlap of the two ends was created where the thickness at the overlap was not greater than 20% more than the tape thickness. The test gaskets of the ring gasket type were positioned on the lower flange so that they were centered relative to the inner and outer diameters of the flange. The upper flange 102 was positioned on top of the gasket and aligned with the lower flange. Alignment marks were scribed on the upper and lower flange to allow for consistent alignment of the upper flange with the lower flange in each test. The flanges were bolted together using twelve M20 bolts. The bolts were tightened to a torque of 80 N-m (59 ft lbs.) using a torque wrench and a criss-cross pattern starting at bolt 1 as shown in FIG. 15 in incremental steps of 20.3 N-m (15 ft-lbs.), 40.7 N-m (30 ft lbs.), 61 N-m (45 ft lbs.) and 80 N-m (59 ft lbs.). After the final pass at 80 N-m the bolts were tightened in a circular pass with the torque set to 80 N-m. Ten minutes after the initial torque, the bolts were retightened in a circular pass to 80 N-m (59 ft lbs.).

The internal pressure was then increased to 620 kPa as recorded by the pressure gage 105 using compressed air and valve 104 was then closed. After waiting 15 minutes for the temperature and pressure of the compressed air in the fixture to stabilize, the initial pressure and room temperature measurements were recorded. The fixture was left undisturbed in ambient conditions for about 180 minutes before the final internal pressure and room temperature measurements were recorded. The leak rates based on the pressure drop method were calculated according to the following equation:

$$\text{Leak Rate } (kPa/meter/\min) = \frac{(Pf - Pi)/(\text{average circumference, meters})}{(\text{elapsed time, minutes})}$$

where:

$Pf$ = final internal pressure $(kPa)$ $Pi$ = initial internal pressure $(kPa)$ $$\text{average circumference, meters (m)} = 3.14 \times (\text{outer diameter} + \text{inner diameter})/2 = 1.057 \text{ meters}$$

Figure 11:
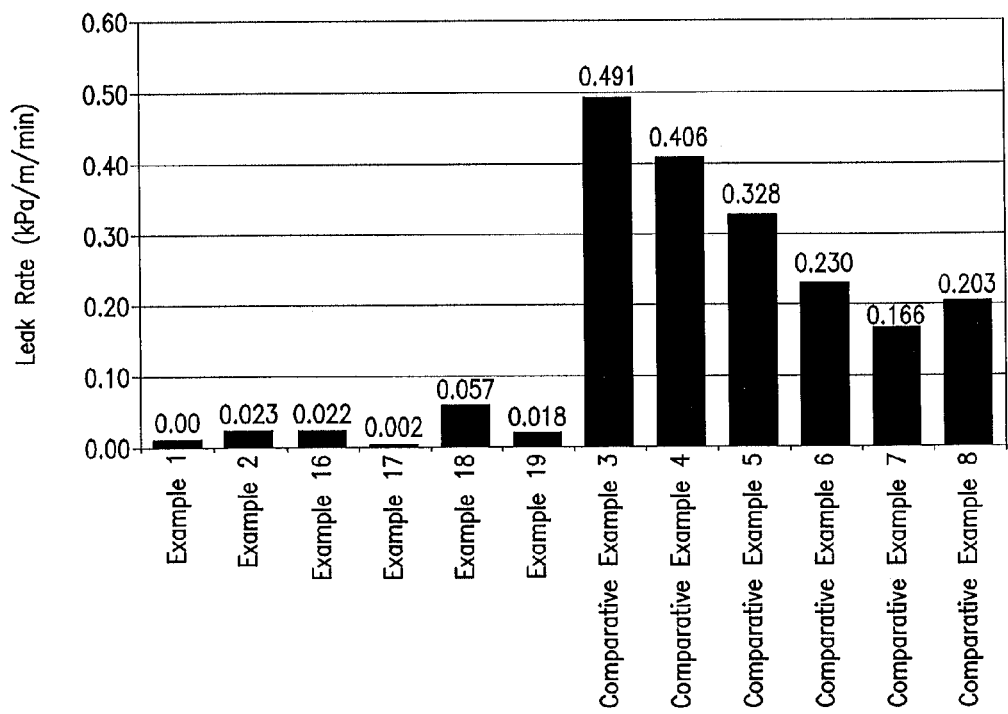
FIG. 11 is a graphical representation of leak rate results of gaskets tested in the Leakage Test.

The leak rates measured for each example can be seen in Table 2. The results are plotted in FIG. 11. The results in Table 2 show that after the 3 hour dwell at room temperature the inventive embodiments of Examples 1, 2 and 16-19 had lower leak rates as compared with Comparative Examples 3-8.

TABLE 2

Gasket Leak Rates

| Material | Initial Thickness (inches) | Initial Pressure (kPa) | Initial Temperature (° C.) | Final Pressure (kPa) | Final Temperature (° C.) | Leak Rate (kPa/m/min) |
|---|---|---|---|---|---|---|
| Example 1 | 0.230 | 618.8 | 22.6 | 617.3 | 22.4 | 0.008 |
| Example 2 | 0.230 | 622.6 | 22.8 | 618.3 | 22.3 | 0.023 |
| Example 16 | 0.220 | 620.7 | 19.4 | 616.6 | 21.3 | 0.022 |
| Example 17 | 0.225 | 623.2 | 21.7 | 622.9 | 22.1 | 0.002 |
| Example 18 | 0.225 | 621.5 | 22.7 | 610.7 | 22.4 | 0.057 |
| Example 19 | 0.225 | 624.4 | 23.1 | 621.0 | 22.5 | 0.018 |
| Comparative Example 3 | 0.267 | 600.5 | 22.4 | 507.0 | 22.7 | 0.491 |
| Comparative Example 4 | 0.265 | 617.7 | 22.7 | 540.4 | 22.3 | 0.406 |
| Comparative Example 5 | 0.265 | 623.5 | 22.9 | 561.1 | 22.4 | 0.328 |
| Comparative Example 6 | 0.205 | 620.8 | 22.4 | 577.1 | 22.3 | 0.230 |
| Comparative Example 7 | 0.216 | 612.0 | 22.4 | 580.4 | 22.4 | 0.166 |
| Comparative Example 8 | 0.213 | 620.3 | 22.6 | 581.6 | 22.3 | 0.203 |

Leakage Test Procedure 2

The leakage behavior of gaskets made substantially according to Example 20 and Comparative Example 21 was tested in accordance with test procedures substantially similar to those of Leakage Test Procedure 1 with the exception that the leakage for each gasket was measured at two stress levels corresponding to a bolt torque value of about 106 N-m (78 ft-lbs.) and about 134 N-m (99 ft-lbs.) The flanges were bolted together using twelve M20 bolts. For the first part of the test where the leak rate was measured at a final bolt torque of 106 N-m, the bolts were tightened using a torque wrench and a criss-cross pattern starting at bolt 1 as shown in FIG. 15 in incremental steps of 27 N-m (20 ft-lbs.), 54 N-m (40 ft lbs.), 81 N-m (60 ft lbs.) and 106 N-m (78 ft lbs.). After each criss-cross pass at each torque increment, a counterclockwise circular pass was made. Ten minutes after the initial torque, the bolts were retightened in a circular pass to 106 N-m (78 ft lbs.).

The internal pressure was then increased to 620 kPa using compressed air. The initial pressure and room temperature measurements were recorded. The fixture was left undisturbed in ambient conditions for about 180 minutes before the final internal pressure and room temperature measurements were recorded. The internal pressure was released from the fixture.

For the second leak rate measurement, the bolts were tightened to 134 N-m using a torque wrench and the same criss-cross pattern. After the criss-cross pass, a counterclockwise circular pass was made. After waiting ten minutes the bolts were retightened in a circular pass to 134 N-m (99 ft lbs.). The internal pressure was then increased to 620 kPa using compressed air. The initial internal pressure and room temperature measurements were recorded. The fixture was left undisturbed in ambient conditions for about 180 minutes before the final internal pressure and room temperature measurements were recorded. The internal pressure was released from the fixture.

The leak rates based on the pressure drop method were calculated according to the equations in the procedures of Leakage Test 1. The leak rates measured for each example can be seen in Table 3. The results in Table 3 show that at the lower torque level of 106 N-m, Example 20 and Comparative Example 21 have similar leak rates. However, at the higher torque of 134 N-m, while the leak rate with Example 20 decreased as a result of the increased gasket stress, Comparative Example 21 experienced a rapid loss of internal pressure due to a very high leak rate. After disassembling the test fixture, it was observed that the gasket of Comparative Example 21 had fractured at that the skive overlap. The fracturing of the PTFE corresponded to the resulting overlap of the densified region of the leading end and the densified region of the trailing end of the gasket.

TABLE 3

Gasket Leak Rates

|  | Example 20 | Comparative Example 21 |
|---|---|---|
| Leak Rate @ 106 N-m Test Data |  |  |
| Initial Pressure (kPa) | 621.8 | 623.8 |
| Initial Temperature (° C.) | 22.8 | 22.4 |
| Final Pressure (kPa) | 615.2 | 620.0 |
| Final Temperature (° C.) | 22.8 | 22.5 |
| Test Time (minutes) | 180 | 180 |
| Leak Rate (kPa/m/minute) | 0.035 | 0.02 |
| Leak Rate @ 134 N-m Test Data |  |  |
| Initial Pressure (kPa) | 622.1 | 617.6 |
| Initial Temperature (° C.) | 22.1 | 23.0 |
| Final Pressure (kPa) | 620.5 | 213.0 |
| Final Temperature (° C.) | 22.8 | 22.9 |
| Test Time (minutes) | 176 | 20 |
| Leak Rate (kPa/m/minute) | 0.0086 | 19.13 |

EXAMPLES

Example 1

An ePTFE/FEP composite gasket of the present invention was produced having four layers of tape in the following manner.

Four lengths approximately ten foot long of GORE-TEX® Series 300 Tape (ePTFE tape) having a nominal width of approximately 50 mm (2 inches) and a nominal thickness of approximately 1.5 mm (0.06 inches) were obtained from W.L. Gore & Associates, Inc. of Newark, Del. The GORE-TEX® Series 300 Tape is comprised of a plurality of biaxially expanded PTFE layers laminated in the z-axis having tensile strength in the longitudinal (x-axis) and transverse (y-axis) directions as taught in U.S. Pat. No. 5,964,465 to Mills et al.

A Teflon® FEP Film, Type A having a width of approximately 50 mm (2 inches) and a thickness of approximately 0.013 mm (0.0005 inches) was obtained from E.I. du Pont de Nemours, Inc. of Wilmington, Del. The FEP film was melt bonded to the top tape surface of one of the ePTFE tapes along the length (x-y plane) of the tape using a hot press substantially similar to the press shown in FIG. 6. The upper platen 61 was heated to about 300° C. and the lower platen 62 was not heated. The upper and lower platens had a length of approximately 200 mm (8 inches). Therefore, 200 mm sections of the ePTFE tape were coated with the FEP at a time. The ePTFE tape 64 was placed on the lower platen top surface 62a. The FEP film 65 was placed on the top surface of the ePTFE tape. Kapton® polyimide film having a nominal thickness of approximately 0.05 mm (0.002 inches) was obtained from E.I. du Pont de Nemours, Inc. of Wilmington, Del. A piece of the Kapton® film 66 was placed on top of the FEP film as a release layer to prevent the FEP from sticking to the heated upper platen. The upper platen was lowered with sufficient pressure being applied so that the ePTFE tape was compressed in the z-axis by no more than 0.25 mm. The upper platen was held in place for approximately three seconds and then lifted from the lower platen. The Kapton® film was removed from the formed ePTFE/FEP composite tape. The next 200 mm section of the ePTFE tape was positioned on the lower platen and the lamination process was repeated. After the entire length of ePTFE tape was coated on the top tape surface with the FEP film, the bottom tape surface of the ePTFE tape was coated with the FEP film along the entire length of the tape. Four lengths of the ePTFE/FEP composite tape were produced according to this method.

The ePTFE/FEP composite tapes were individually calendered to form non-porous regions located between porous regions by compressing a portion of the ePTFE/FEP composite tapes to a density of at least about 1.8 g/cc. The non porous regions having a width of about 0.5 mm and a thickness of about 0.5 mm were formed by compressing the porous PTFE using a calendering machine substantially similar to the machine shown in FIG. 7. The resulting channel depth of the compressed region was about 1 mm. The tapes were calendered with the top tape surface facing the calendering roller 71. The calendering roller 71 was substantially similar to the one shown in FIGS. 8a and 8b having a tapered boss 80 having a width at the tip of the boss of about 0.5 mm. The upper roller 72 was an aluminum roller with a smooth surface. The drive roller 73 was a silicone coated aluminum roller with a smooth surface. The air pressure was set to approximately 276 kPa (40 psi) resulting in a downward force of about 623N (140 lbs.) applied to the upper roller 72. A Steinel® HG3002LCD 1500 W hot air gun 74 was used to preheat the ePTFE/FEP composite tape 70 prior to forming the compressed region rendering the ePTFE softer and more compressible. The temperature of the hot air was set to approximately 177° C. (350° F.). The hot air was directed at the contact point of the upper roller 72 and the ePTFE/FEP composite tape 70. The ePTFE/FEP composite tapes 70 were fed into the rollers at a rate of about 1.2 meters per minute (4 feet per minute). The ePTFE/FEP composite tapes were aligned with the tapered boss 80 on the calendering roller 71 so that the compressed regions were formed to one side of the centerline of the tape as shown in FIG. 3. This facilitates the non-porous regions to be staggered when the tapes are laminated together. As illustrated in FIG. 3, the compressed region 15 formed a substantially non-porous region 15 separating two porous regions 28 of the tape.

Referring to FIG. 9, two of the four calendered tapes 90 were laminated together with adjoining top tape surfaces using a lamination machine substantially similar to that shown. The gap between the two nip rollers 91 was set to about 2.7 mm (0.105 inches) using metal shims. The lamination speed was about 200 mm/minute (8 inches/minute). The Leister® Hot Jet S hot air gun 92 (Leister Process Technologies, Sarnen, Switzerland) was set to the maximum temperature setting of 6 and to the maximum air flow setting of 4. The ePTFE/FEP composite tapes 90 were fed into the lamination machine with the non porous regions in each tape aligned on either side of the centerline of the laminated tape 93. The FEP layers on the top tape surfaces of each tape formed an interface (12 in FIG. 3) between the laminated tapes (10 and 11 in FIG. 3). The remaining two calendered tapes 90 were laminated together following the procedures described above.

The two laminated tapes were then laminated together in a similar manner but with the roller gap set to about 5.6 mm (0.22 inches) using shims. The four tapes were aligned substantially similar to that shown in FIG. 3 and having substantially non-porous upper and lower gasket surfaces 37. Non-porous regions 15 of adjoining tapes 10, 11 were alternately aligned in the z-axis direction as shown in FIG. 3.

The final laminate tape comprising the four calendered tapes was trimmed to a final width of about 32 mm (1.25 inches) using a razor blade. The final thickness of the laminated tape was about 5.8 mm (0.23 inches). A pressure sensitive adhesive having a nominal width of about 19 mm (0.75 inches) was applied to one surface of the tape. The pressure sensitive adhesive was a styrene butadiene rubber (SBR) based adhesive with a polyester carrier film having a release paper on one side.

The laminated tape made according to this example was formed into a gasket and tested for leakage in accordance with the procedures of the Leakage Test Procedure 1. The results can be found in Table 2 and FIG. 11.

Example 2

An ePTFE/FEP composite gasket of the present invention was produced having two layers of tape in the following manner.

Two approximately 2.4 meter (8 foot) long lengths of GORE-TEX® Series 300 Tape (ePTFE tape) having a nominal width of approximately 45 mm (1.77 inches) and a nominal thickness of approximately 3 mm (0.12 inches) were obtained from W.L. Gore & Associates, Inc. of Newark, DE.

A Teflon® FEP Film, Type A having a width of approximately 50 mm (2 inches) and a thickness of approximately 0.013 mm (0.0005 inches) was obtained from E.I. du Pont de Nemours, Inc. of Wilmington, DE. The FEP film was centered on the ePTFE tape and was melt bonded to the top tape surface of one of the ePTFE tapes along the length (x-y plane) of the tape substantially as described in Example 1. The second 2.4 meter long ePTFE tape was coated with FEP and the top and bottom tape surfaces in a similar manner. The excess FEP was left to overhang the sides of the ePTFE tapes.

The two ePTFE/FEP composite tapes were individually calendered to form non-porous regions located between porous regions by compressing a portion of the ePTFE to a density of at least about 1.8 g/cc. The non-porous regions having a width of about 1 mm and a thickness of about 1 mm were formed using a calendering machine substantially similar to the machine shown in FIG. 7. The tapes were calendered with the top tape surface facing the calendering roller 71. The calendering roller 71 was substantially similar to the one shown in FIGS. 8a and 8b having a tapered boss 80 having a width at the tip of the boss of about 1 mm. The upper roller 72 was an aluminum roller with a smooth surface. The drive roller 73 was a silicone coated aluminum roller with a smooth surface. The air pressure was set to approximately 414 kPa (60 psi) resulting in a downward force of about 943N (212 lbs.) applied to the upper roller 72. A Steinel® HG3002LCD 1500 W hot air gun 74 was used to preheat the ePTFE/FEP composite tape prior to forming the compressed region rendering the ePTFE softer and more compressible. The temperature of the hot air was set to approximately 177° C. (350° F.). The hot air was directed at the contact point of the upper roller 72 and the ePTFE/FEP composite tape 70. The ePTFE/FEP composite tapes 70 were fed into the rollers at a rate of about 1.2 meters per minute (4 feet per minute). The ePTFE/FEP composite tapes were aligned with the tapered boss 80 on the calendering roller 71 so that the compressed regions were formed to one side of the centerline of the tape as shown in FIG. 5. This facilitates the non-porous regions to be staggered when the tapes are laminated together. As illustrated in FIG. 5, the compressed region formed a substantially non-porous region 15 separating two porous regions 28 of the tape.

The two calendered tapes 90 were laminated together in a manner substantially similar to FIG. 5 wherein the substantially non-porous regions of the stacked tapes were not substantially aligned in the z-axis direction. A lamination machine substantially similar to that shown in FIG. 9 was used. The gap between the two nip rollers 91 was set to about 5.6 mm (0.22 inches) using metal shims. The lamination speed was about 200 mm/minute (8 inches/minute). The Leister® Hot Jet S hot air gun 92 (Leister Process Technologies, Sarnen, Switzerland) was set to the maximum temperature setting of 6 and to the maximum air flow setting of 4. The ePTFE/FEP composite tapes 90 were fed into the lamination machine with the non porous regions in each tape to either side of the centerline of the laminated tape 93. The FEP layers on the top tape surfaces of each tape formed an interface (12 in FIG. 5) between the laminated tapes (10 and 11 in FIG. 5). The laminated tape comprising the two calendered tapes 10, 11 was trimmed to a final width of about 32 mm (1.25 inches) using a razor blade. The final thickness of the laminated tape was about 5.8 mm (0.23 inches). A pressure sensitive adhesive having a nominal width of about 19 mm (0.75 inches) was applied to one surface of the tape. The pressure sensitive adhesive was a styrene butadiene rubber (SBR) based adhesive with a polyester carrier film having a release paper on one side.

The laminated tape made according to this example having substantially air impermeable upper and lower gasket surfaces was formed into a gasket and tested for leakage in accordance with the procedures of the Leakage Test Procedure 1. The results can be found in Table 2 and FIG. 11.

Comparative Examples 3-5

Samples of GORE-TEX® Series 600 Gasket Tape with adhesive were obtained from W.L. Gore & Associates, Inc. of Newark, De. The tape was comprised of multiple layers of porous ePTFE membrane having a thickness of about 6.8 mm (0.267 inches), a nominal width of about 30 mm and a length of about 1.5 meters.

The tapes were formed into three gaskets and tested for leakage in accordance with the procedures of the Leakage Test Procedure 1. The results can be found in Table 2 and FIG. 11.

Comparative Examples 6-8

Three GORE Universal Pipe Gaskets each having an inner diameter of about 305 mm (12 inches), an outer diameter of about 368.3 mm (14.5 inches) and a thickness of about 5.2 mm (0.205 inches) were obtained from W.L. Gore & Associates, Inc. of Newark, Del.

The gaskets made according to this example were tested for leakage in accordance with the procedures of the Leakage Test Procedure 1 described herein. The results can be seen in Table 2 and FIG. 11.

Example 9

An ePTFE/FEP composite form-in-place gasket of the present invention was produced substantially according the methods described in Example 2 with the exceptions that the ePTFE tape had an initial width of about 60 mm, an initial length of about 3.4 meters (11 feet) and the FEP layers having a width of about 50 mm were centered on the tape between the two outer edges. The laminated tape was trimmed to a final width of about 20 mm (0.787 inches). The laminated tape had a thickness of about 5.5 mm (0.218 inches). A pressure sensitive adhesive having a nominal width of about 9.6 mm (0.375 inches) was applied to one surface of the tape. The pressure sensitive adhesive was a styrene butadiene rubber (SBR) based adhesive with a polyester carrier film having a release paper on one side.

The laminated tape made according to this example was formed into a gasket and tested for sealability in accordance with the procedures of the Sealability Test described herein. The results can be found in Table 1 and FIG. 13.

Example 10

An ePTFE/FEP composite form-in-place gasket of the present invention was produced having two layers of tape.

The gasket was formed substantially according to the method described in Example 2 with the exceptions that the ePTFE tape had an initial width of about 60 mm, an initial length of about 3.4 meters, and the FEP layers having a width of about 50 mm were centered on the tape between the two outer edges. The laminated tape was trimmed to a final width of about 20 mm and had a thickness of about 5.5 mm (0.218 inches). A pressure sensitive adhesive having a nominal width of about 9.6 mm (0.375 inches) was applied to one surface of the tape. The pressure sensitive adhesive was a styrene butadiene rubber (SBR) based adhesive with a polyester carrier film having a release paper on one side.

The laminated tape 93 made according to this example was formed into a gasket and tested for sealability in accordance with the procedures of the Sealability Test described herein. The results can be found in Table 1 and FIG. 13.

Example 11

An ePTFE/FEP composite gasket of the present invention was produced having two layers of tape and porous upper and lower gasket surfaces.

Two approximately 4.3 meter (14 foot) long lengths of GORE-TEX® Series 300 Tape (ePTFE tape) having a nominal width of approximately 50 mm (2 inches) and a nominal thickness of approximately 3 mm (0.12 inches) were obtained from W.L. Gore & Associates, Inc. of Newark, Del.

A Teflon® FEP Film, Type A having a width of approximately 50 mm (2 inches) and a thickness of approximately 0.013 mm (0.0005 inches) was obtained from E.I. du Pont de Nemours, Inc. of Wilmington, Del. The FEP film was melt bonded to the top tape surface of one of the ePTFE tapes along the length (x-y plane) of the tape using a hot press substantially similar to the press shown in FIG. 6. The upper platen 61 was heated to about 300° C. and the lower platen 62 was not heated. The upper and lower platens had a length of approximately 200 mm (8 inches). Therefore, 200 mm sections of the ePTFE tape were coated with the FEP at a time. The ePTFE tape 64 was placed on the lower platen top surface 62*a*. The FEP film 65 was placed on the top tape surface of the ePTFE tape. Kapton® polyimide film having a nominal thickness of approximately 0.05 mm (0.002 inches) was obtained from E.I. du Pont de Nemours, Inc. of Wilmington, Del. A piece of the Kapton® film 66 was placed on top of the FEP film as a release layer to prevent the FEP from sticking to the heated upper platen. The upper platen was lowered with sufficient pressure being applied so that the ePTFE tape was compressed in the z-axis by no more than 0.25 mm. The upper platen was held in place for approximately three seconds and then lifted from the lower platen. The Kapton® film was removed from the formed ePTFE/FEP composite tape. The next 200 mm section of the ePTFE tape was positioned on the lower platen and the lamination process was repeated. The second 4.3 meter long ePTFE tape was coated with FEP on the top tape surface in a similar manner.

The two ePTFE/FEP composite tapes were individually calendered to form non-porous regions located between porous regions by compressing a portion of the ePTFE/FEP composite tapes to a density of at least about 1.8 g/cc. The non-porous regions were formed having a width of about 1 mm and a thickness of about 1 mm by compressing the porous PTFE using a calendering machine substantially similar to the machine shown in FIG. 7. The tapes were calendered with the top tape surface facing the calendering roller 71. The calendering roller 71 was substantially similar to the one shown in FIGS. 8*a* and 8*b* having a tapered boss 80 having a width at the tip of the boss of about 1 mm. The upper roller 72 was an aluminum roller with a smooth surface. The drive roller 73 was a silicone coated aluminum roller with a smooth surface. The air pressure was set to approximately 60 psi resulting in a downward force of about 943N (212 lbs.) applied to the upper roller 72. A Steinel® HG3002LCD 1500 W hot air gun 74 was used to preheat the ePTFE/FEP composite tape prior to forming the compressed region rendering the ePTFE softer and more compressible. The temperature of the hot air was set to approximately 177° C. (350° F.). The hot air was directed at the contact point of the upper roller 72 and the ePTFE/FEP composite tape 70. The ePTFE/FEP composite tapes 70 were fed into the rollers at a rate of about 1.2 meters per minute (4 feet per minute). The ePTFE/FEP composite tapes were aligned with the tapered boss 80 on the calendering roller 71 so that the compressed regions were formed to one side of the centerline of the tape as shown in FIG. 5. This facilitates the non-porous regions to be staggered when the tapes are laminated together. As illustrated in FIG. 5, the compressed region formed a substantially non-porous region 15 separating two porous regions 28 of the tape.

The two calendered tapes were laminated together in a manner substantially similar to FIG. 5 wherein the substantially non-porous regions of the stacked tapes were not substantially aligned in the z-axis direction and wherein the FEP layers coated on the top tape surfaces formed an interface 12 between the two tapes. A lamination machine substantially similar to that shown in FIG. 9 was used. The gap between the two nip rollers 91 was set to about 5.6 mm (0.22 inches) using metal shims. The lamination speed was about 200 mm/minute (8 inches/minute). The Leister® Hot Jet S hot air gun 92 (Leister Process Technologies, Sarnen, Switzerland) was set to the maximum temperature setting of 6 and to the maximum air flow setting of 4. The ePTFE/FEP composite tapes 90 were fed into the lamination machine with the non porous regions in each tape to either side of the centerline of the laminated tape. The adjoining FEP layers on the top tape surfaces of each tape formed an interface (12 in FIG. 5) between the laminated tapes (10 and 11 in FIG. 5) leaving porous upper and lower gasket surfaces 37. The laminated tape 93 comprising the two calendered tapes was trimmed to a final width of about 20 mm (0.787 inches) using a razor blade. The final thickness of the laminated tape was about 6.4 mm (0.25 inches). A pressure sensitive adhesive having a nominal width of about 9.6 mm (0.375 inches) was applied to the porous lower gasket surface of the tape. The pressure sensitive adhesive was a styrene butadiene rubber (SBR) based adhesive with a polyester carrier film having a release paper on one side.

The laminated tape made according to this example was formed into a gasket and tested for sealability in accordance with the procedures of the Sealability Test described herein. The results can be found in Table 1 and FIG. 13.

Example 12

An ePTFE/FEP composite form-in-place gasket of the present invention was produced substantially according the methods described in Example 11 with the exception that one of the two ePTFE tapes 10 was coated with FEP on both the top and bottom tape surfaces forming a gasket in which one of the gasket upper and lower surfaces was non-porous and the other gasket surface was porous. The second ePTFE tape 11 was coated with FEP on only the top tape surface. The ePTFE/FEP composite calendered tapes were laminated together with adjoining FEP layers on the top tape surfaces forming an interface 12 between the two tapes. The laminated tape was trimmed to a final width of about 20 mm (0.787 inches). The laminated tape 93 had a thickness of about 5.5 mm (0.218 inches). A pressure sensitive adhesive having a nominal width of about 9.6 mm (0.375 inches) was applied to the porous composite tape surface corresponding to the lower gasket surface of the tape. The pressure sensitive adhesive was a styrene butadiene rubber (SBR) based adhesive with a polyester carrier film having a release paper on one side.

The laminated tape made according to this example was formed into a gasket and tested for sealability in accordance with the procedures of the Sealability Test described herein. The results can be found in Table 1 and FIG. 13.

Comparative Examples 13-15

Samples of GORE-TEX® Series 600 Gasket Tape with adhesive was obtained from W.L. Gore & Associates, Inc. of Newark, Del. The tapes were comprised of multiple layers of ePTFE membrane having a thickness of about 6.7 mm (0.262 inches), a nominal width of 20 mm and a length of about 1 meter.

The tapes were formed into three gaskets and tested for sealability in accordance with the procedures of the Sealability Test described herein. The results can be found in Table 1 and FIG. 13.

Example 16

An ePTFE/FEP composite form-in-place gasket of the present invention was produced substantially according the methods described in Example 11 with the exception that the air pressure applied during the calendering step was set to about 483 kPa (70 psi). The laminated tape was trimmed to a final width of about 32 mm (1.25 inches). The laminated tape had a thickness of about 5.6 mm (0.22 inches). A pressure sensitive adhesive having a nominal width of about 19 mm (0.75 inches) was applied to the porous surface of the composite tape corresponding to the lower gasket surface of the tape. The pressure sensitive adhesive was a styrene butadiene rubber (SBR) based adhesive with a polyester carrier film having a release paper on one side.

The laminated tape made according to this example was formed into a gasket and tested for leakage in accordance with the procedures of the Leakage Test Procedure 1 described herein. The results can be found in Table 2 and FIG. 11.

Examples 17-18

Expanded PTFE/FEP composite gaskets of the present invention were produced having four layers of tape and upper and lower porous gasket surfaces in the following manner.

Two approximately 4.6 meter (15 feet) long lengths of GORE-TEX® Series 300 Tape (ePTFE tape) having a nominal width of approximately 40 mm (1.5 inches) and a nominal thickness of approximately 3.2 mm (0.12 inches) were obtained from W.L. Gore & Associates, Inc. of Newark, Del.

A Teflon® FEP Film, Type A having a width of approximately 50 mm (2 inches) and a thickness of approximately 0.013 mm (0.0005 inches) was obtained from E.I. du Pont de Nemours, Inc. of Wilmington, Del. The FEP film was melt bonded to the top tape surface of one of the ePTFE tapes along the length (x-y plane) of the tape using a hot press substantially similar to the press shown in FIG. 6. The upper platen 61 was heated to about 300° C. and the lower platen 62 was not heated. The upper and lower platens had a length of approximately 200 mm (8 inches). Therefore, 200 mm sections of the ePTFE tape were coated with the FEP at a time. The ePTFE tape 64 was placed on the lower platen top surface 62a. The FEP film 65 was placed on the top surface of the ePTFE tape. Kapton® polyimide film having a nominal thickness of approximately 0.05 mm (0.002 inches) was obtained from E.I. du Pont de Nemours, Inc. of Wilmington, Del. A piece of the Kapton® film 66 was placed on top of the FEP film as a release layer to prevent the FEP from sticking to the heated upper platen. The upper platen was lowered with sufficient pressure being applied so that the ePTFE tape was compressed in the z-axis by no more than 0.25 mm. The upper platen was held in place for approximately three seconds and then lifted from the lower platen. The Kapton® film was removed from the formed ePTFE/FEP composite tape. The next 200 mm section of the ePTFE tape was positioned on the lower platen and the lamination process was repeated.

After the entire length of ePTFE tape was coated on the top tape surface with the FEP film, a 0.5 mm thick layer including the FEP layer was peeled from the 3.2 mm thick ePTFE/FEP composite tape forming an approximately 2.7 mm thick ePTFE tape and a 0.5 mm thick ePTFE/FEP composite tape with FEP on the top tape surface. The approximately 2.7 mm thick ePTFE tape was coated on the remaining top and bottom tape surfaces with FEP in accordance with the procedures described above. The second 3.2 mm thick ePTFE tape was processed in substantially the same manner. Two lengths of ePTFE/FEP composite tape with a nominal thickness of about 0.5 mm with FEP on the top tape surface and two lengths ePTFE/FEP composite tape with a nominal thickness of about 2.7 mm with FEP on the top and bottom tape surfaces were produced according to this method.

The four ePTFE/FEP composite tapes were individually calendered to form non-porous regions between porous regions by compressing a portion of the ePTFE/FEP composite tapes to a density of at least about 1.8 g/cc. The non porous regions 15 having a width of about 1 mm and a thickness of about 0.17 mm in the 0.5 mm thick ePTFE/FEP composite tapes and a thickness of about 0.9 mm in the 2.7 mm thick tapes were formed using a calendering machine substantially similar to the machine shown in FIG. 7. The tapes were calendered with the top tape surface facing the calendering roller 71. The calendering roller 71 was substantially similar to the one shown in FIGS. 8a and 8b having a tapered boss 80 having a width at the tip of the boss of about 1 mm. The air pressure was set to approximately 345 kPa (50 psi) resulting in a downward force of about 787 N (177 lbs.) applied to the upper roller 72 when calendering the approximately 0.5 mm thick ePTFE/FEP composite tapes. The air pressure was set to approximately 483 kPa (70 psi) when calendering the approximately 2.7 mm thick ePTFE/FEP composite tapes. The ePTFE/FEP composite tapes were calendered with the FEP coated top tape surfaces facing the calendering roller 71. A Steinel® HG3002LCD 1500 W hot air gun 74 was used to preheat the ePTFE/FEP composite tape prior to forming the compressed region. Pre-heating the ePTFE makes it softer and more compressible. The temperature of the hot air gun 74 was set to approximately 177° C. (350° F.). The ePTFE/FEP composite tapes 70 were fed into the calendering rollers at a rate of about 1.2 meters per minute (4 feet per minute). The ePTFE/FEP composite tapes were aligned with the tapered boss 80 on the calendering roller 71 so that the compressed regions were formed to one side of the centerline of the tape as shown in FIG. 3. This facilitates the non-porous regions 15 to be staggered when the tapes are laminated together. The compressed region formed a substantially non-porous region separating two porous regions of the tape.

One of the approximately 0.5 mm thick ePTFE/FEP composite tapes was laminated with one of the approximately 2.7 mm thick ePTFE/FEP composite tapes using a lamination machine substantially similar to that shown in FIG. 9. The FEP coated top tape surface of the approximately 0.5 mm thick ePTFE/FEP composite tape 90 was bonded to the FEP coated top tape surface of the approximately 2.7 mm thick ePTFE/FEP composite tape 90. The gap between the two nip rollers 91 was set to about 2.7 mm (0.105 inches) using metal shims. The lamination speed was about 300 mm/minute (12 inches/minute). The hot air gun 92 was set to the maximum temperature setting and to the maximum air flow setting.

The remaining calendered approximately 0.5 mm thick ePTFE/FEP composite tape was laminated with the remaining calendered approximately 2.7 mm thick ePTFE/FEP composite tape following the procedures described above. The two laminated tapes were then laminated together in a similar manner with the porous surface of the two approximately 0.5 mm thick ePTFE/FEP composite tapes forming the outer surfaces of the final laminate tape. The roller gap was set to about 5.5 mm (0.215 inches). The tapes were arranged substantially similarly to FIG. 3.

The final laminate tape comprising the four calendered tapes was trimmed to a final width of about 32 mm (1.25 inches) using a razor blade. The final thickness of the laminated tape was about 5.7 mm (0.225 inches). A pressure sensitive adhesive having a nominal width of about 19 mm (0.75 inches) was applied to one surface of the tape. The pressure sensitive adhesive was a styrene butadiene rubber (SBR) based adhesive with a polyester carrier film having a release paper on one side.

The approximately 4.6 meter long laminated ePTFE/FEP composite tape was cut into three approximately equal lengths of about 1.5 meters. Two of the 1.5 meter long laminated composite tapes made according to this example were formed into gaskets and tested for leakage in accordance with the procedures of the Leakage Test Procedure 1. The results can be found in Table 2 and FIG. 11.

Example 19

An ePTFE/FEP composite gasket of the present invention was produced having three layers of tape and having a non-porous upper gasket surface and a porous lower gasket surface.

Three approximately 4.6 meter (15 feet) long lengths of GORE-TEX® Series 300 Tape (ePTFE tape) having a nominal width of approximately 50 mm (2 inches) and a nominal thickness of approximately 2 mm (0.08 inches) were obtained from W.L. Gore & Associates, Inc. of Newark, Del.

A Teflon® FEP Film, Type A having a width of approximately 50 mm (2 inches) and a thickness of approximately 0.013 mm (0.0005 inches) was obtained from E.I. du Pont de Nemours, Inc. of Wilmington, Del. The FEP film was melt bonded to the top tape surface of one of the ePTFE tapes along the length (x-y plane) of the tape using a hot press substantially similar to the press shown in FIG. 6. The upper platen 61 was heated to about 300° C. and the lower platen 62 was not heated. The upper and lower platens had a length of approximately 200 mm (8 inches). Therefore, 200 mm sections of the ePTFE tape were coated with the FEP at a time. The ePTFE tape 64 was placed on the lower platen top surface 62a. The FEP film 65 was placed on the top surface of the ePTFE tape. Kapton® polyimide film having a nominal thickness of approximately 0.05 mm (0.002 inches) was obtained from E.I. du Pont de Nemours, Inc. of Wilmington, Del. A piece of the Kapton® film 66 was placed on top of the FEP film as a release layer to prevent the FEP from sticking to the heated upper platen. The upper platen was lowered with sufficient pressure being applied so that the ePTFE tape was compressed in the z-axis by no more than 0.25 mm. The upper platen was held in place for approximately three seconds and then lifted from the lower platen. The Kapton® film was removed from the formed ePTFE/FEP composite tape. The next 200 mm section of the ePTFE tape was positioned on the lower platen and the lamination process was repeated until the entire length of the ePTFE tape was coated with FEP on the top tape surface. The bottom tape surface was coated with FEP along the length of the tape in a similar manner. The second 4.3 meter long ePTFE tape was coated with FEP on the top and bottom tape surfaces in a similar manner. The third 4.6 meter long ePTFE tape was coated with the FEP on only the top tape surface in a similar manner.

The three ePTFE/FEP composite tapes were individually calendered to form non-porous regions located between porous regions by compressing a portion the ePTFE/FEP composite tapes to a density of at least about 1.8 g/cc. The non-porous regions having a width of about 1 mm and a thickness of about 0.6 mm were formed using a calendering machine substantially similar to the machine shown in FIG. 7. The tapes were calendered with the top tape surface facing the calendering roller 71. The calendering roller 71 was substantially similar to the one shown in FIGS. 8*a* and 8*b* having a tapered boss 80 having a width at the tip of the boss of about 1 mm. The air pressure was set to approximately 60 psi. A Steinel® HG3002LCD 1500 W hot air gun 74 was used to preheat the ePTFE/FEP composite tape during the calendering step. The temperature of the hot air was set to approximately 177° C. (350° F.). The hot air was directed at the contact point of the upper roller 72 and the ePTFE/FEP composite tape 70. The ePTFE/FEP composite tapes 70 were fed into the rollers at a rate of about 1.2 meters per minute (4 feet per minute). The ePTFE/FEP composite tapes were aligned with the top roller so that the compressed regions were formed to one side of the centerline of the tape.

The third of the three ePTFE tapes having the FEP coating on only the top tape surface was laminated to one of the two calendered ePTFE/FEP composite tapes having FEP on the top and bottom tape surfaces using a lamination machine substantially similar to that shown in FIG. 9. The two tapes 90 were laminated together so that the top tape surfaces of the two tapes were joined with the non-porous regions on either side of the centerline of the laminated tape. The gap between the two nip rollers 91 was set to about 3.6 mm (0.140 inches) using metal shims. The lamination speed was about 300 mm/minute (12 inches/minute). The hot air gun 92 was set to the maximum temperature setting and to the maximum air flow settings. The remaining calendered ePTFE/FEP composite tape having FEP on the top and bottom tape surfaces was laminated to the previously laminated two tapes in a similar manner with the exception that the nip roller gap was set to 5.5 mm (0.215 inches). The top tape surface of the remaining tape was bonded with the FEP coated surface of the previously laminated two tapes.

A final laminate tape comprising the three calendered ePTFE/FEP composite tapes was produced. The tape was trimmed to a final width of about 32 mm (1.25 inches) using a razor blade. The final thickness of the laminated tape was about 5.7 mm (0.225 inches). A pressure sensitive adhesive having a nominal width of about 19 mm (0.75 inches) was applied to the porous lower gasket surface of the tape. The pressure sensitive adhesive was a styrene butadiene rubber (SBR) based adhesive with a polyester carrier film having a release paper on one side.

The laminated tape made according to this example was formed into a gasket having a non-porous upper gasket surface and a porous lower gasket surface. The gasket was tested for leakage in accordance with the procedures of the Leakage Test Procedure 1. The results can be found in Table 2 and FIG. 11.

Example 20

An ePTFE/FEP composite form-in-place gasket of the present invention was produced having four tape layers.

A gasket was formed comprising a laminate of multiple ePTFE tapes and FEP layers substantially according the methods described in Example 1 with the exception that in the calendering step the width of the tip of the tapered boss 80 on the calendering roller 71 was about 0.5 mm (0.020 inches). The laminated tape was trimmed to a final width of about 32 mm (1.25 inches) and a thickness of about 5.8 mm (0.228 inches). The laminated tape made according to this example was formed into a gasket and tested for leakage in accordance with the procedures of Leakage Test Procedure 2. The results can be found in Table 3.

Comparative Example 21

An ePTFE/FEP composite form-in-place gasket of the prior art was formed in the following manner.

A single length of approximately twelve foot long GORE-TEX® Series 600 Tape (ePTFE tape) having a nominal width of approximately 32 mm (1.266 inches) and a nominal thickness of approximately 6.7 mm (0.265 inches) was obtained from W.L. Gore & Associates, Inc. of Newark, Del. The GORE-TEX® Series 600 Tape is comprised of a plurality of biaxially expanded PTFE layers laminated in the z-axis having tensile strength in the longitudinal (x-axis) and transverse (y-axis) directions as taught in U.S. Pat. No. 5,964,465 to Mills et al.

A Teflon® FEP Film, Type A having a width of approximately 50 mm (2 inches) and a thickness of approximately 0.013 mm (0.0005 inches) was obtained from E.I. du Pont de Nemours, Inc. of Wilmington, Del. The FEP film was melt bonded to top tape surface of the ePTFE tape along the length (x-y plane) of the tape using a hot press substantially similar to the press shown in FIG. 6. The upper platen 61 was heated to about 300° C. and the lower platen 62 was not heated. The upper and lower platens had a length of approximately 200 mm (8 inches). Therefore, 200 mm sections of the ePTFE tape were coated with the FEP at a time. The ePTFE tape 64 was placed on the lower platen top surface 62*a*. The FEP film 65 was placed on the top surface of the ePTFE tape. Kapton® polyimide film having a nominal thickness of approximately 0.05 mm (0.002 inches) was obtained from E.I. du Pont de Nemours, Inc. of Wilmington, Del. A piece of the Kapton® film 66 was placed on top of the FEP film as a release layer to prevent the FEP from sticking to the heated upper platen. The upper platen was lowered with sufficient pressure being applied so that the ePTFE tape was compressed in the z-axis by no more than 0.25 mm. The upper platen was held in place for approximately three seconds and then lifted from the lower platen. The Kapton® film was removed from the formed ePTFE/FEP composite tape. The next 200 mm section of the ePTFE tape was positioned on the lower platen and the lamination process was repeated. After the entire length of ePTFE tape was coated on the top tape surface with the FEP film, the bottom tape surface of the ePTFE tape was coated with the FEP film along the entire length of the tape. The excess FEP in the width direction was trimmed from the composite tape using a razor blade.

The ePTFE/FEP composite tape was calendered to form a non-porous region between two porous ePTFE regions using a calendering machine substantially similar to the machine shown in FIG. 7 with the exception that the upper roller 72 and calendering roller 71 were replaced with two matching calendering rollers substantially similar to the calendering roller shown in FIGS. 8*a* and 8*b* wherein the width at the tip of the tapered boss 80 was about 2 mm. The two calendering rollers compressed the single ePTFE tape in the thickness direction from the top and bottom tape surfaces towards the center of the thickness of the tape forming channels along the length of the tape on the top and bottom tape surfaces. The ePTFE was compressed to a density of at least about 1.8 g/cc resulting in a thickness in the non-porous region of about 2 mm and channel depths of about 2.4 mm. The non-porous region was located approximately equal distant from the sides of the tape. The ePTFE/FEP composite tape 70 was fed into the calendering rollers at a rate of about 1.2 meters per minute (4 feet per minute).

The tape made according to this example was formed into a gasket and tested for leakage substantially in accordance with the procedures of Leakage Test Procedure 2 with the exception that in the second part of the test with the leak rate measured at 134 N-m, the test was stopped after only twenty minutes due to the rapid loss of internal pressure which resulted from the high leak rate associated with a fracturing of the PTFE at the skive overlap. The results can be found in Table 3.

The invention claimed is:

1. A multilayer form-in-place gasket comprising
   an upper and lower gasket surface, and
   at least two tapes of porous polytetrafluoroethylene (PTFE) in a stacked configuration,
       each porous PTFE tape comprising
       a top tape surface,
       a bottom tape surface, and a length,
           wherein at least one region along the length of each tape is densified through a thickness of the tape forming at least one substantially non-porous region such that the regions of porous PTFE material are separate from each other by the non-porous region, and a substantially air impermeable layer disposed on the top tape surface of at least one of the at least two tapes that forms an interface between the at least two tapes,
       wherein the substantially non-porous regions of at least two tapes are not aligned in the thickness direction.

2. The gasket of claim 1 wherein at least one of the at least two tapes comprises expanded PTFE (ePTFE).

3. The gasket of claim 2 wherein at least one of the at least two tapes comprises monoaxially expanded PTFE.

4. The gasket of claim 2 wherein at least one of the at least two tapes comprises biaxially expanded PTFE.

5. The gasket of claim 2 wherein at least one of the at least two tapes comprises multiaxially expanded PTFE.

6. The gasket of claim 1 wherein at least one of the at least two tapes is monolithic ePTFE.

7. The gasket of claim 1 wherein at least one of the at least two tapes comprises multiple layers of ePTFE.

8. The gasket of claim 7, wherein the layers ePTFE are selected from monoaxially, biaxially or multiaxially expanded PTFE or combinations thereof.

9. The gasket of claim 1, wherein the tape is porous microcellular PTFE.

10. The gasket of claim 1 wherein the at least one substantially air impermeable layer and the at least one substantially non-porous region of each tape form a substantially air impermeable barrier extending the length of the tape that is continuous from the upper gasket surface to the lower gasket surface.

11. The gasket of claim 1, wherein the substantially non-porous region extends from the top tape surface to the bottom tape surface.

12. The gasket of claim 1, wherein the substantially non-porous region defines a channel along the top surface of the porous PTFE tape, having channel sides and the at least one substantially air impermeable layer is further disposed on the channel sides.

13. The gasket of claim 12, wherein the substantially non-porous region defines a channel on each of the top and bottom tape surfaces of the porous PTFE tape, having channel sides and the at least one substantially air impermeable layer is further disposed on the channel sides.

14. The gasket of claim 1 wherein the at least two tapes are joined by at least one substantially air impermeable layer.

15. The gasket of claim 14 further comprising at least one additional tape.

16. The gasket of claim 1 wherein the at least two tapes are joined at top tape surfaces by two substantially air impermeable layers.

17. The gasket of claim 1, wherein the at least two tapes are joined by the substantially air impermeable layer disposed on the top tape surface of a first tape and a porous PTFE bottom tape surface of a second tape.

18. The gasket of claim 1, wherein the upper gasket surface comprises a substantially air impermeable layer.

19. The gasket of claim 1, wherein the upper gasket surface and lower gasket surface comprise an air impermeable layer.

20. The gasket of claim 1, wherein at least one of the at least two tapes comprises at least one substantially air impermeable layer disposed on the top and bottom surfaces of the porous PTFE.

21. The gasket of claim 1, wherein all of the tapes comprise a substantially air impermeable layer disposed on the top and bottom tape surfaces of the porous PTFE.

22. The gasket of claim 21, wherein the at least two tapes are joined at the bottom tape surfaces.

23. The gasket of claim 22, further comprising at least one additional tape joined to the top surface of at least one of the at least two tapes.

24. The gasket of claim 1, wherein the substantially air impermeable layer comprises tetrafluoroethylene/hexafluoropropylene copolymer (FEP).

25. The gasket of claim 1, wherein the substantially air impermeable layer comprises tetrafluoroethylen/(perfluoroalkyl) vinyl ether copolymer (PFA).

26. The gasket of claim 1, wherein the substantially air impermeable layer comprises densified ePTFE.

27. The gasket of claim 1, wherein at least one of the at least two tapes comprises at least two substantially non-porous regions.

28. The gasket of claim 1, wherein at least one of the at least two tapes comprises multiple layers of porous PTFE, the substantially non-porous regions in adjacent layers of the at least two tapes are not aligned in the thickness direction.

29. The gasket of claim 1, wherein the porous PTFE tape further comprises at least one filler.

30. The gasket of claim 29, wherein at least one filler comprises at least one material selected from metals, semi-metals, metal oxides, glasses, activated carbons, carbon blacks and polymeric resins.

31. The gasket of claim 29, wherein the at least one filler comprises at least one material selected from silica, barium sulfate, graphite and glass beads.

* * * * *